(12) United States Patent
Nagasaka et al.

(10) Patent No.: US 7,104,703 B2
(45) Date of Patent: Sep. 12, 2006

(54) OPTICAL TRANSCEIVER AND METHOD FOR PRODUCING THE SAME

(75) Inventors: Kimio Nagasaka, Nirasaki (JP); Akira Miyamae, Fujimi-machi (JP); Takeo Kaneko, Misato-mura (JP); Eiichi Fujii, Fujimi-machi (JP); Jun Amako, Matsumoto (JP); Tsugio Ide, Nagato-machi (JP); Shojiro Kitamura, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/601,707

(22) Filed: Jun. 24, 2003

(65) Prior Publication Data

US 2004/0022487 A1    Feb. 5, 2004

(30) Foreign Application Priority Data

Jul. 1, 2002   (JP) ............................. 2002-192634
Feb. 6, 2003   (JP) ............................. 2003-030030

(51) Int. Cl.
G02B 6/36   (2006.01)
G02B 6/14   (2006.01)
G02B 6/42   (2006.01)

(52) U.S. Cl. ........................... 385/88; 385/14; 355/52; 355/15

(58) Field of Classification Search ................. 385/88, 385/14, 15, 47, 52, 89
See application file for complete search history.

(56) References Cited

U.S. PATENT DOCUMENTS

| | | | |
|---|---|---|---|
| 4,188,708 A * | 2/1980 | Frederiksen ................. | 438/25 |
| 4,722,587 A | 2/1988 | Thorsten | |
| 4,876,446 A * | 10/1989 | Kambe et al. .............. | 250/221 |
| 5,424,573 A * | 6/1995 | Kato et al. .................. | 257/431 |
| 6,040,934 A | 3/2000 | Ogusu et al. | |
| 6,330,464 B1 * | 12/2001 | Colvin et al. ............... | 600/316 |
| 6,338,949 B1 * | 1/2002 | Darnell et al. ............. | 435/69.1 |
| 6,536,957 B1 * | 3/2003 | Buchter ....................... | 385/89 |
| 6,588,949 B1 * | 7/2003 | Zhou ............................ | 385/94 |
| 2003/0048998 A1 * | 3/2003 | Li ................................ | 385/88 |
| 2003/0201462 A1 * | 10/2003 | Pommer et al. ............ | 257/200 |

FOREIGN PATENT DOCUMENTS

| | | |
|---|---|---|
| JP | A-60-153184 | 8/1985 |
| JP | A-60-233601 | 11/1985 |
| JP | 62-215910 | 9/1987 |
| JP | 04-3005 | 1/1992 |
| JP | 04-53912 | 2/1992 |
| JP | A-04-241477 | 8/1992 |
| JP | A-11-509687 | 8/1999 |
| JP | A-2001-36100 | 2/2001 |
| JP | 2001-174672 | 6/2001 |
| JP | A-2002-033546 | 1/2002 |
| JP | A-2003-503858 A | 1/2003 |
| WO | WO 97/04491 | 2/1997 |
| WO | WO 01-01497 A1 | 1/2001 |

* cited by examiner

Primary Examiner—Kaveh Kianni
(74) Attorney, Agent, or Firm—Oliff & Berridge,PLC

(57) ABSTRACT

The invention provides an optical transceiver which makes it possible to simplify a production process. An optical transceiver of the present invention includes an optical socket to mount an optical plug disposed at one end portion of an optical fiber); a light-condensing device; and an optical element to emit light in accordance with a supplied electrical signal and an optical element to generate an electrical signal in accordance with a received light signal; and a light-transmissive substrate to support the optical socket, the light-condensing device, and the optical elements so that the optical fiber, the light-condensing device, and the optical elements are aligned on an optical axis of the optical transceiver.

11 Claims, 22 Drawing Sheets

CROSS SECTION ALONG LINE I-I'

(a)          (b)

FIG. 5
(a) 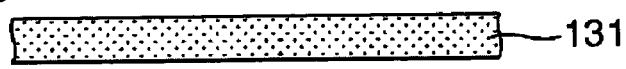
(b) 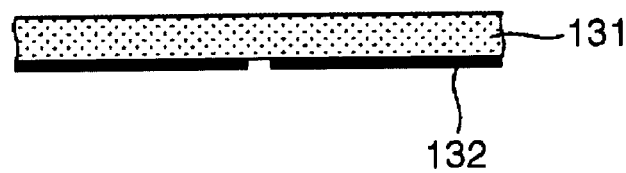
(c) 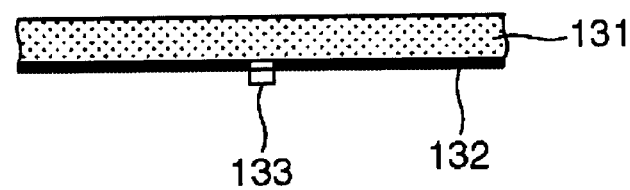
(d) 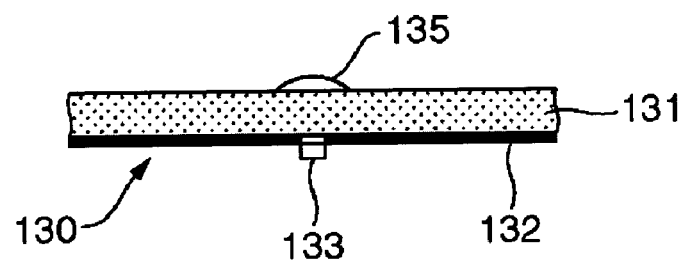
(e) 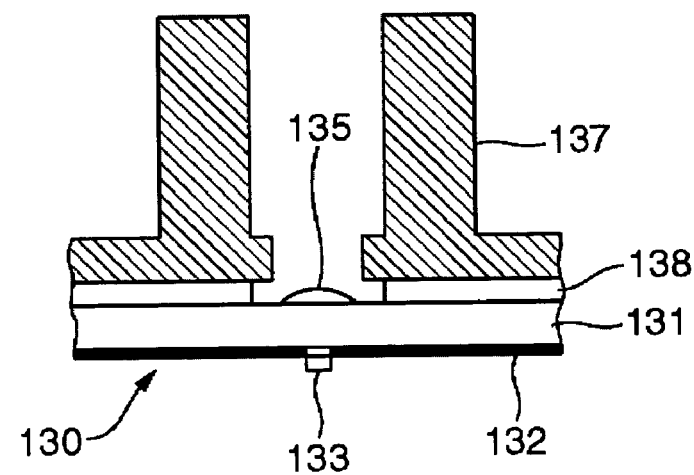

FIG. 14
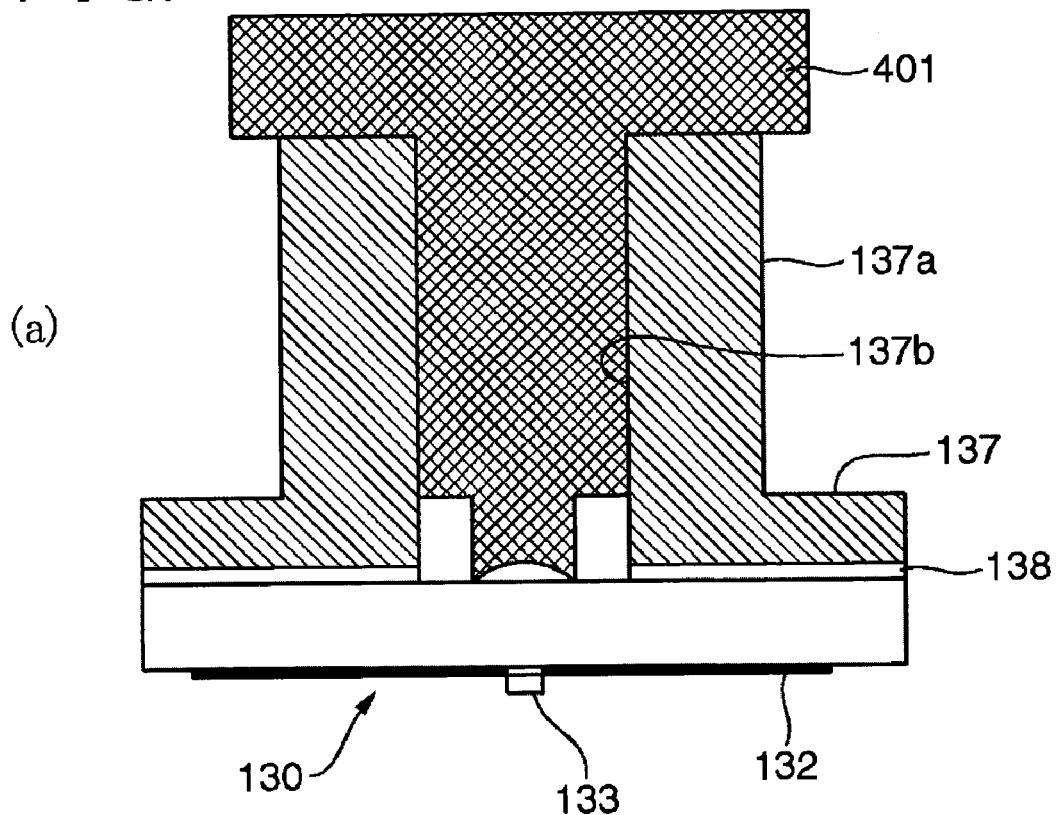
(a)
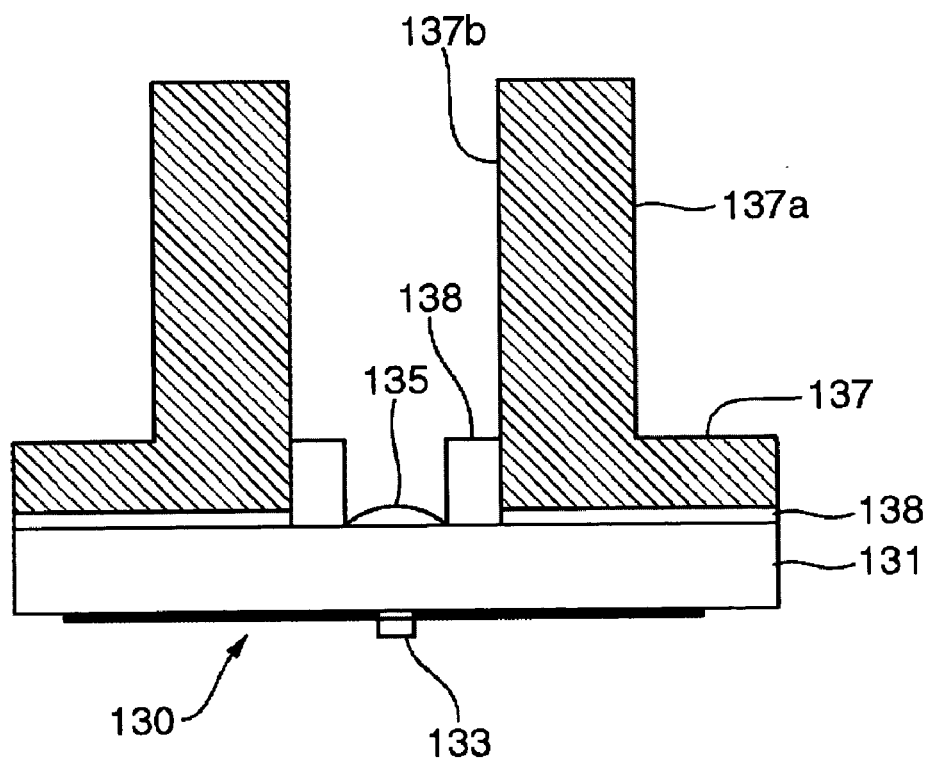
(b)

F I G. 2 0
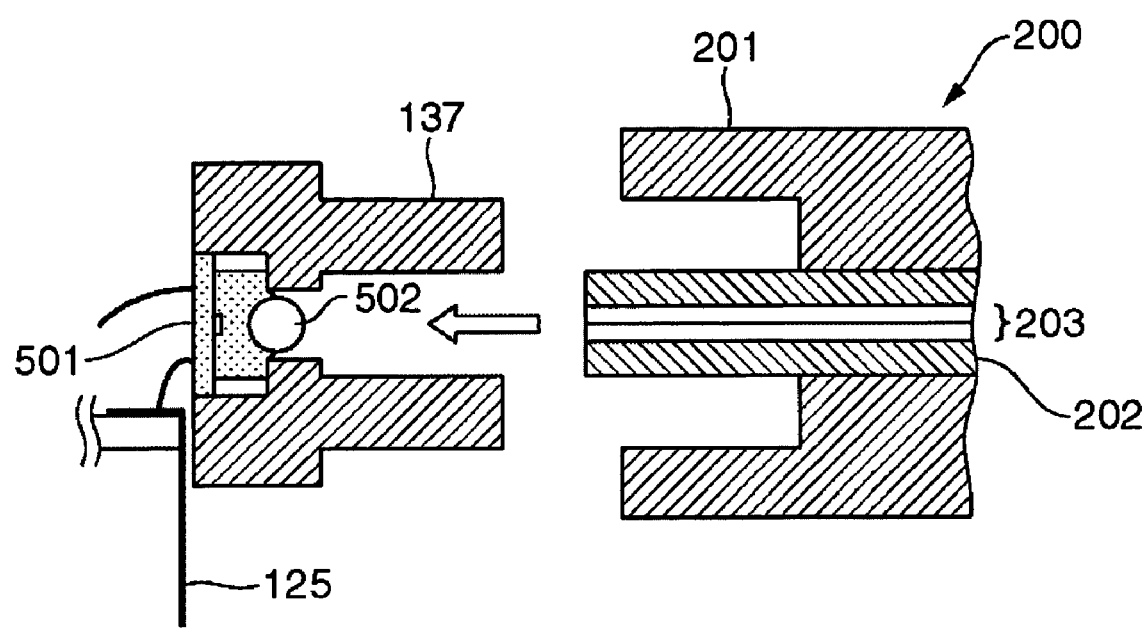

FIG. 21
(a)
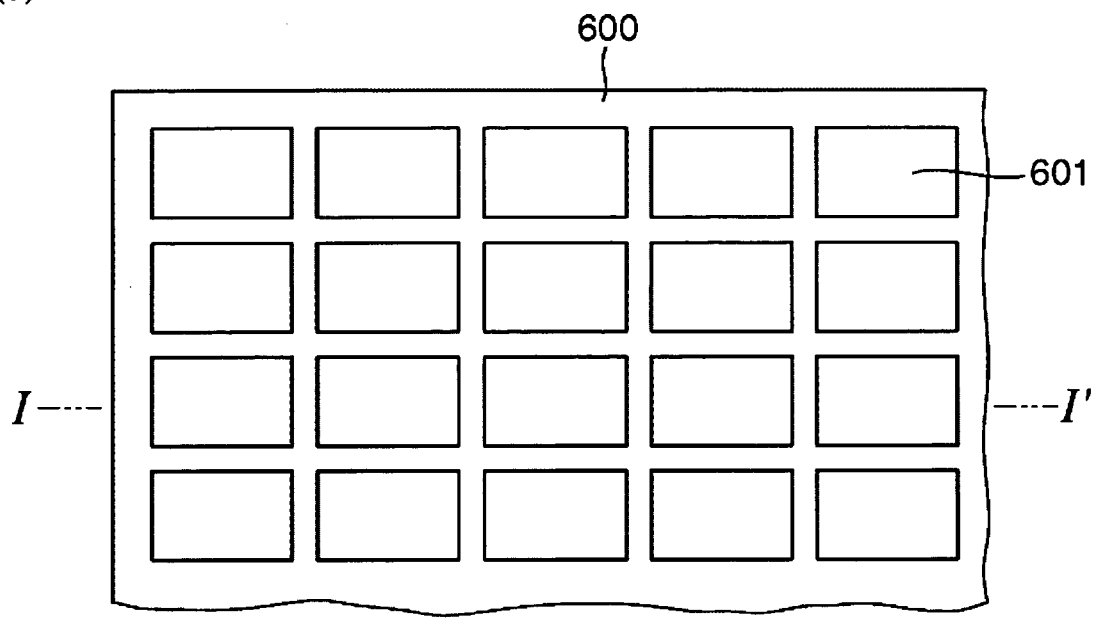
(b)
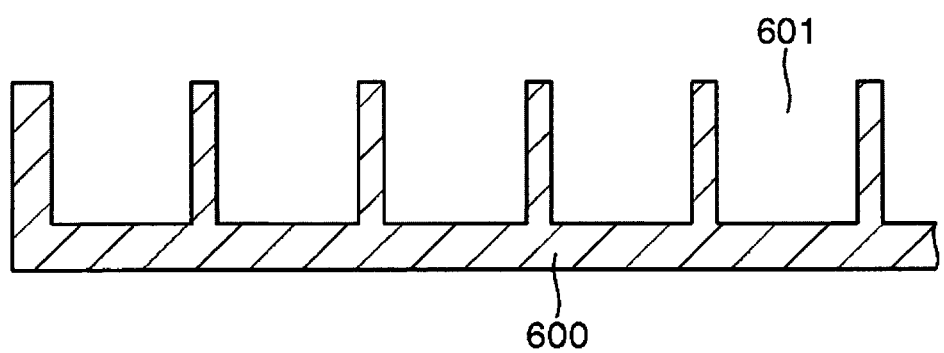
(c)
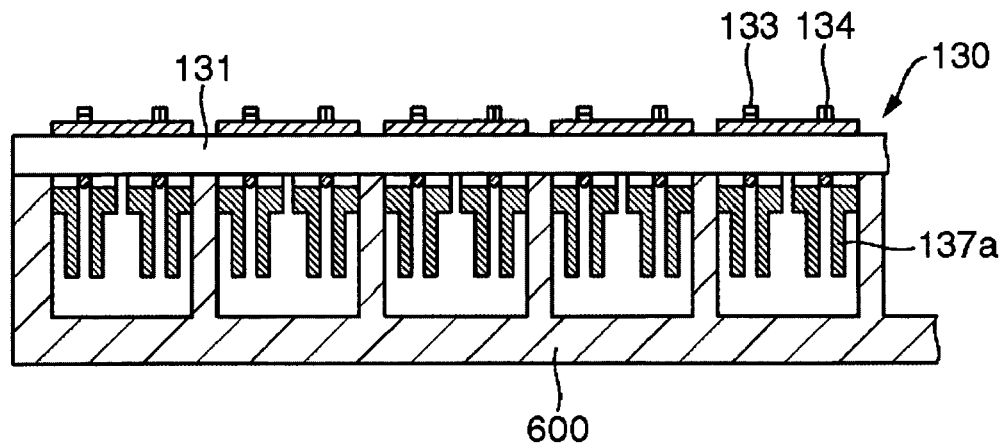

FIG. 22
(a)
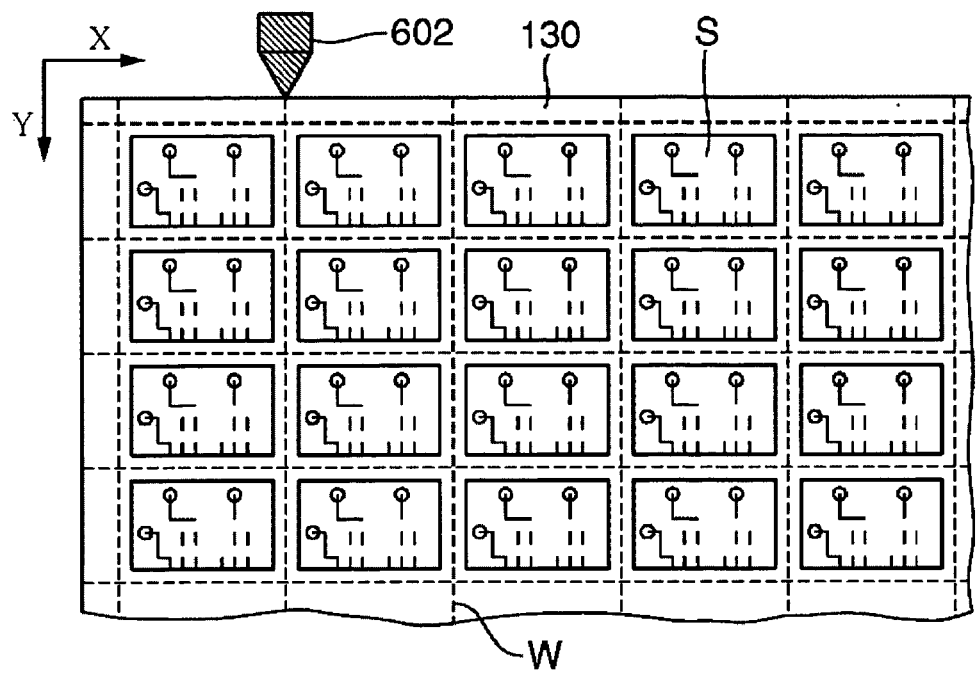
(b)
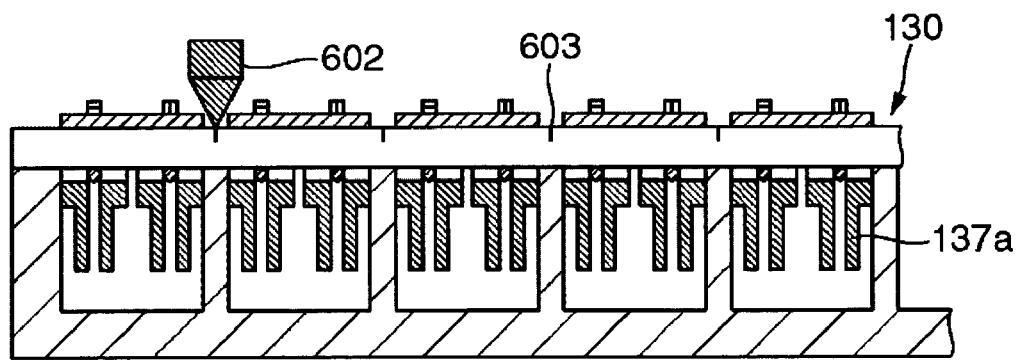

FIG. 25
(a)
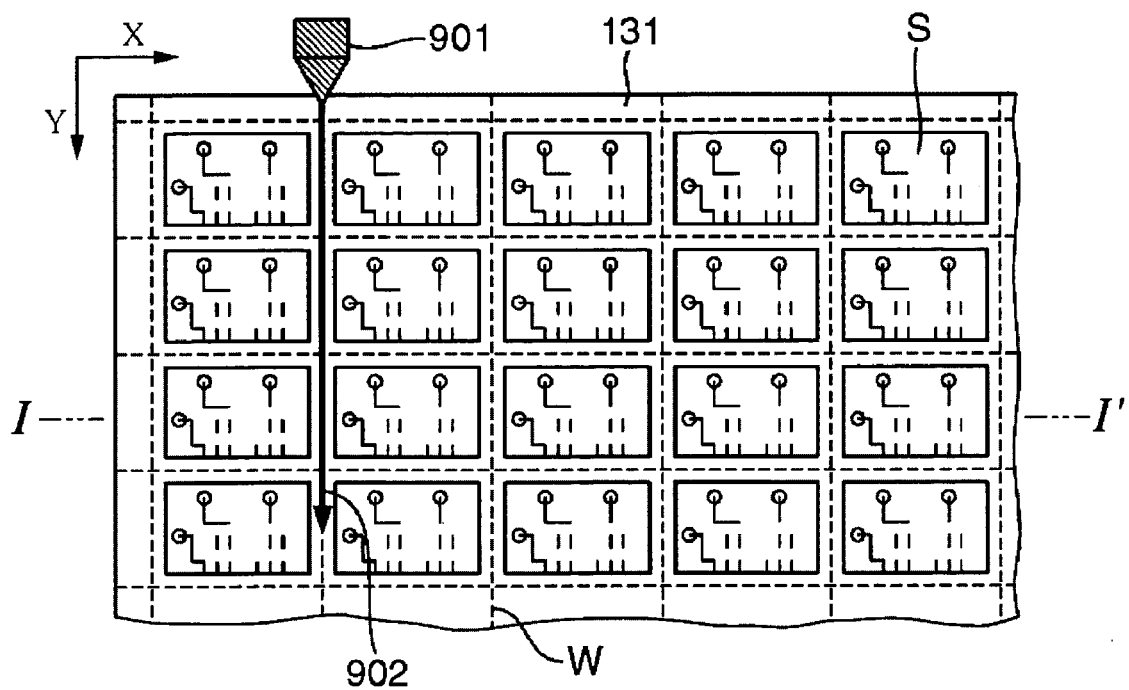
(b)
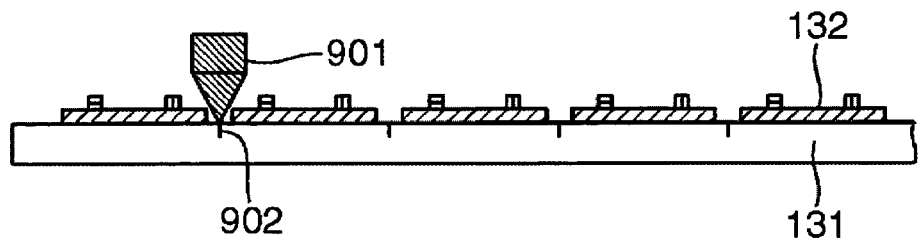

OPTICAL TRANSCEIVER AND METHOD FOR PRODUCING THE SAME

BACKGROUND OF THE INVENTION

1. Field of Invention

The present invention relates to an optical transceiver used for transmission and/or reception using an optical fiber as a medium. The method also relates to a method of producing the same.

2. Description of Related Art

Optical fibers can be used in the related art in, for example, local area networks (LANs), direct connectors to mutually connect computers, connectors to mutually connect computers and digital audio/video devices, etc. In these devices, an optical transceiver is used. The optical transceiver converts an electrical signal to a light signal, transmits the light signal to an optical fiber, and converts the light signal received from the optical fiber back into an electrical signal. For example, the optical transceiver includes a socket, a ball lens, and an integrated circuit (IC) substrate. The socket receives a plug that is mounted to one end of the optical fiber. The ball lens is disposed between the one end of the optical fiber and an optical element, such as a light receiver or a light emitter, and is used to focus light. The IC substrate is used to drive the optical element by converting a parallel signal into a serial signal, and to convert the serial signal back to a parallel signal by amplifying a received signal.

In a related method of producing such an optical transceiver, the following three steps are ordinarily carried out. In the first step, a laser diode (LD) chip is mounted in a can package, and the chip and a lead wire are bonded together. In addition, the ball lens is adhered to a light-exiting window of the can package, so that the can package with the lens is assembled. In the second step, the can package is inserted into one of the insertion holes of the optical socket, and a ferrule with a fiber is inserted into the other insertion hole of the optical socket. An electric current flows through the lead wire of the can package so that the laser diode emits light. The light quantity that allows coupling with the fiber is measured, and the can package and the optical socket are adhered to each other at a position where the coupling efficiency is optimal (active alignment). In the third step, the lead wire of the can package is soldered to the substrate.

SUMMARY OF THE INVENTION

However, in the above method of producing such an optical transceiver, a complicated three-dimensional alignment must be carried out when assembling the components, so that the proportion of manual operation in the production process is large. This results in increased costs of the product.

Accordingly, the present invention provides a method of producing an optical transceiver that makes it possible to simplify a production process.

The present invention provides an optical transceiver including an optical socket to mount an optical plug disposed at one end of an optical fiber; a light-condensing device; an optical element to emit light in accordance with a supplied electrical signal or to generate an electrical signal in accordance with a received light signal; and a light-transmissive substrate to support the optical socket, the light-condensing device, and the optical element so that the optical fiber, the light-condensing device, and the optical element are aligned on an optical axis of the optical transceiver.

By virtue of such a structure, it is possible to combine the optical element, the light-condensing device, and the optical socket using a light-transmissive substrate.

According to the present invention, there may be provided an optical transceiver including an optical socket for mounting an optical plug that holds one end of a first optical fiber and one end of a second optical fiber; first and second light-condensing devices; a light emitter to emit light in accordance with a supplied electrical signal; a light receiver to generate an electrical signal in accordance with a received light signal; and a light-transmissive substrate to support the optical socket, the first and second light-condensing devices, the light emitter, and the light receiver so that the first optical fiber, the first light-condensing device, and the light emitter are aligned on a first optical axis of the optical transceiver and so that the second optical fiber, the second light-condensing device, and the light receiver are aligned on a second optical axis of the optical transceiver.

By virtue of such a structure, it is possible to, using a light-transmissive substrate, combine the optical socket, the light-condensing device, the light emitter, and the light receiver.

It is desirable that the optical element be disposed on one surface of the substrate, and the light-condensing device and the optical socket be disposed on the other surface of the substrate in correspondence with the location of the optical element. By this, it is possible to, using both surfaces of the light-transmissive substrate and making use of the thickness of the light-transmissive substrate, combine the optical socket, the light-condensing device, and the optical element used for transmission or reception.

It is desirable that the optical element be disposed on one surface of the substrate and the optical socket be disposed on the other surface of the substrate in correspondence with the location of the optical element, and that a plurality of the light-condensing devices be used, with one of the light-condensing devices being disposed on the other surface of the substrate in correspondence with the location of the optical element and another light-condensing device being disposed near an end of the optical socket so as to oppose the optical element.

By virtue of this structure, when light (from the optical element) focused by the light-condensing device disposed on the substrate enters an effective range of the light-condensing device disposed at the optical socket, or when light (from the optical fiber) focused by the light-condensing device disposed at the optical socket enters an effective range of the light-condensing device disposed on the substrate, it is possible to achieve optical coupling between the optical element and the optical fiber. Therefore, it is possible to very easily align the optical socket and the optical element, so that costs can be reduced by simplifying the production process.

The aforementioned "effective range of the light-condensing device" corresponds to, for example, the effective diameter of the light-condensing device when the light-condensing device is a hemispherical lens. It is more desirable that the focal length of each of the light-condensing device be set so that light passing between them becomes substantially parallel light (that is, so that the light is substantially collimated). By this, the alignment can be more easily carried out.

It is desirable that the light emitter and the light receiver be disposed on one surface of the substrate, and the first and second light-condensing devices and the optical socket be disposed on the other surface of the substrate, with the first and second light-condensing devices being disposed on the other surface of the substrate in correspondence with the locations of the light emitter and the light receiver, respectively. By this, it is possible to provide the required optical distance for each light-condensing device by making use of the thickness of the substrate.

It is desirable that the optical elements be disposed on one surface of the substrate and the optical socket be disposed on the other surface of the substrate in correspondence with the locations of the optical elements, and the first and second light-condensing devices be disposed so that one of the first and second light-condensing devices is disposed on the other surface of the substrate in correspondence with the location of one of the optical elements and the other of the first and second light-condensing devices is disposed near an end of the optical socket so as to oppose the one of the optical elements.

By this, the optical socket and the optical elements are very easily aligned, so that costs can be reduced by simplifying the production process. Even in this case too, it is more desirable that the focal length of each light-condensing device be set so that light passing between them becomes substantially parallel light (that is, so that the light is substantially collimated). By this, the alignment can be more easily carried out.

Although, it is desirable that the substrate be a glass substrate having, for example, excellent transparency and heat resistance, the substrate may be, for example, a plastic substrate.

It is desirable that the substrate have a plurality of guide holes, and that the optical socket have a plurality of guide pins that are disposed in the respective guide holes. By this, the substrate and the optical socket are easily aligned.

It is desirable that the optical socket be joined to the substrate by, for example, adhesion, fusing, or screwing.

It is desirable that the light-condensing device or each light-condensing device be any one of a refractive lens, a Fresnel lens, and a Selfoc lens. By virtue of this structure, it is possible to reduce light loss between the (each) optical element and an end of the (each) optical fiber. Here, in the specification, a Fresnel lens has a sawtooth shape in cross section and a concentric circular shape that allows a large portion of transmitted light to be focused at substantially one point. A Fresnel lens is sometimes called a diffraction grating lens.

It is desirable that the optical element or the light emitter be a surface emitting laser.

According to the present invention, there is provided a method of producing an optical transceiver including: forming a wiring film, serving as a wiring pattern, on one surface of a light-transmissive substrate; joining an optical element having a light-emitting or light-receiving function to a predetermined location of the wiring film; disposing a lens on the other surface of the substrate; and mounting an optical socket to the other surface of the substrate, with the optical socket being used to mount an optical plug that holds one end of an optical fiber.

According to the present invention, there is provided a method of producing an optical transceiver including: forming a wiring layer, serving as a wiring pattern, on one surface of a light-transmissive substrate; joining an optical element having a light-emitting or light-receiving function to a predetermined location of the wiring film; and mounting an optical socket incorporating a lens to the other surface of the substrate, with the optical socket being used to mount an optical plug that holds one end of an optical fiber. The lens that is incorporated in the optical socket is mounted to, for example, the inner portion of the body or near an end of the optical socket. The lens focuses light that is incident upon the optical fiber or that exists from the optical fiber.

By virtue of such a structure, it is possible to produce an optical transceiver that uses a light-transmissive substrate.

According to the present invention, there is provided a method of producing an optical transceiver including: forming a guide hole in a predetermined location of a light-transmissive substrate; forming a wiring film, serving as a wiring pattern, on one surface of the substrate by positioning the wiring film so that the wiring film is aligned with the guide hole; connecting an optical element to the wiring film by positioning the optical element with respect to the other surface of the substrate with the guide hole as a reference; mounting a lens to the substrate by positioning the lens with respect to the other surface of the substrate with the guide hole as a reference; and positioning an optical socket with respect to and mounting the optical socket to the substrate by inserting a guide pin of the optical socket into the guide hole from the other surface of the substrate, the optical socket being used to mount an optical plug that holds one end of an optical fiber.

According to the present invention, there is provided a method of producing an optical transceiver including: forming a guide hole in a predetermined location of a light-transmissive substrate; forming a wiring film, serving as a wiring pattern, on one surface of the substrate by positioning the wiring film so that the wiring film is aligned with the guide hole; connecting an optical element to the wiring film by positioning the optical element with respect to the other surface of the substrate with the guide hole as a reference; positioning the optical socket incorporating a lens with respect to and mounting the optical socket to the substrate by inserting a guide pin of the optical socket into the guide hole from the other surface of the substrate, the optical socket being used to mount an optical plug that holds one end of an optical fiber. The lens that is incorporated in the optical socket is mounted to the inner portion of the body of the optical socket. The lens focuses light that is incident upon the optical fiber or that exists from the optical fiber.

It is desirable to use this structure because the optical socket and the substrate can be aligned by simply inserting the guide pins of the optical socket into the guide holes of the substrate.

It is desirable that a plurality of the guide holes be formed in the substrate and a plurality of the guide pins be formed in the optical socket. It is desirable to use this structure because, since rotational shifting of the optical socket with one guide hole as the center is reduced or prevented from occurring, the substrate and the optical socket are more precisely aligned.

It is desirable that the one end of the optical fiber be supported by a cylindrical ferrule disposed in the central portion of the optical plug, that the ferrule be inserted into a sleeve of the optical socket, the sleeve having a cylindrical hole, and that the lens be disposed at the bottom portion of the hole.

According to the present invention, there is provided a method of producing an optical transceiver including: forming a plurality of wiring films, serving as unit wiring patterns, on one surface of a substrate; disposing a plurality of optical elements on the one surface of the substrate in correspondence with the locations of the plurality of unit wiring patterns; disposing a plurality of lenses on the other surface of the substrate in correspondence with the locations of the optical elements; mounting a plurality of optical sockets to the other surface of the substrate in correspondence with respective pairs of the optical elements and the lenses, each optical socket having a fitting hole to mount an optical plug that holds one end of an optical fiber; and cutting the substrate into areas including the respective unit wiring patterns.

According to the present invention, there is provided a method of producing an optical transceiver including: forming a plurality of wiring films, serving as unit wiring patterns, on one surface of a substrate; disposing a plurality of optical elements on the one surface of the substrate in correspondence with the locations of the plurality of unit wiring patterns; mounting a plurality of optical sockets incorporating respective lenses to the other surface of the substrate in correspondence with respective pairs of the optical elements and the lenses, each optical socket having a fitting hole to mount an optical plug that holds one end of an optical fiber; and cutting the substrate into areas including the respective unit wiring patterns. The lenses that are incorporated in the respective optical sockets are mounted to, for example, the inner portions of the bodies of the optical sockets. The lenses focus light that is incident upon the optical fibers or that exists from the optical fibers.

By virtue of such a structure, by producing at the same time a plurality of optical transceivers on one parent substrate and separating the optical transceivers into individual optical transceivers at the end, it is possible to successively mount the components at a high speed.

It is desirable that the step of mounting the optical sockets include securing the optical sockets to the substrate after adjusting the positions of the optical sockets so that the centers of the corresponding fitting holes are disposed on optical axes connecting the corresponding optical elements and the corresponding lenses. By this, it is possible to reduce loss in connection by disposing each optical fiber, each lens, and each optical element on its corresponding one optical axis.

It is desirable that the disposing of the lenses includes forming the lenses at the same time by resin molding using a lens-shaped die.

It is desirable that the disposing of the lenses includes forming the lenses by adhering a liquid hardening resinous material to the substrate, by forming a surface of the resinous material into a substantially spherical surface by surface tension of the resinous material, and hardening the resinous material.

It is desirable to carry out the cutting so that the substrate is placed on a cutting stage that is formed so the sleeves of the sockets are provided in spaces. The cutting stage has holes in correspondence with the unit wiring patterns. By accommodating the sleeves of the optical sockets in the holes, it is possible to cut the substrate using an ordinary scriber or cutter.

It is desirable to carry out the cutting so that a line is scribed on a surface of the substrate using a scriber. After scribing the line, the substrate is removed from the cutting stage and is cut along the line.

It is desirable to carry out the cutting using a laser. For example, an object may be cut by forming an initial crack in the object by, for example, irradiating a cutting starting point using a femtosecond laser, and by increasing the size of the initial crack by producing thermal stress using, for example, a $CO_2$ laser after forming the initial crack. A $CO_2$ laser beam is branched by a diffraction grating into first and second beams, so that the initial crack is formed by irradiation with the first beam, and the size of the initial crack is increased by generating thermal stress by irradiation with the second beam.

It is desirable that the cutting be carried out by making use of multiphoton absorption resulting from irradiation with a pulse laser. By irradiating the substrate with a laser beam having large pulse oscillation and a very high intensity so that it is focused in the substrate, an altered layer is formed by the multiphoton absorption in the substrate, and is increased in size, so that the substrate is cut.

If the substrate is cut using a hard material or a laser, the substrate is cut without using water (which is used in dicing), so that the wiring and the mounting surface are not affected. According to the method using a laser, trash, such as pieces of glass, are not produced.

According to the present invention, there is provided a method of producing an optical transceiver including: forming a plurality of wiring films, serving as unit wiring patterns, on one surface of a substrate; disposing a plurality of optical elements on the one surface of the substrate in correspondence with the locations of the plurality of unit wiring patterns; disposing a plurality of lenses on the other surface of the substrate in correspondence with the locations of the optical elements; forming a low rigidity area along an intended cutting line of the substrate after the disposing of the optical elements or the disposing of the lenses; mounting a plurality of optical sockets to the other surface of the substrate in correspondence with respective pairs of the optical elements and the lenses, each optical socket having a fitting hole to mount an optical plug that holds one end of an optical fiber; and cutting the substrate along the low rigidity area into areas including the respective unit wiring patterns.

According to the present invention, there is provided a method of producing an optical transceiver including: forming a plurality of wiring films, serving as unit wiring patterns, on one surface of a substrate; disposing a plurality of optical elements on the one surface of the substrate in correspondence with the locations of the plurality of unit wiring patterns; forming a low rigidity area along an intended cutting line of the substrate; mounting a plurality of optical sockets incorporating respective lenses to the other surface of the substrate in correspondence with respective pairs of the optical elements and the lenses, each optical socket having a fitting hole to mount an optical plug that holds one end of an optical fiber; and cutting the substrate along the low rigidity area into areas including the respective unit wiring patterns. The lenses that are incorporated in the optical sockets are mounted to, for example, the inner portions of the bodies or near ends of the optical sockets. The lenses focus light that is incident upon the optical fibers or that exists from the optical fibers.

By virtue of the method including the above, since a low rigidity area is formed prior to mounting the optical sockets, it is possible to use, for example, an ordinary scriber so that it does not get in the way of the sleeves of the optical sockets. In addition, a plurality of optical sockets can be mounted at the same time on the substrate having the low rigidity area. Therefore, by separating optical transceivers into individual optical transceivers along the low rigidity area after mounting the optical sockets, it is possible to successively produce the optical transceivers at a high speed.

It is desirable that the low rigidity area be formed by scribing a line on a surface of the substrate using a scriber. The blade of the scriber is formed of a hard material, such as diamond or a hard alloy. Although it depends upon the material of the substrate, since the mounting of the optical sockets is the next step, the scribing is carried out under a condition that is less difficult for microcracks to be formed compared to an ordinary scribing condition.

It is desirable to form the low rigidity area by forming an initial crack in the substrate, and then increasing the size of the initial crack along a predetermined cutting line by making use of thermal stress that has been produced in the substrate by irradiation with a laser beam. However, the mounting of the optical sockets is the next step. Therefore, in order not to cut the substrate to the extent that the cracks reach the back side of the substrate, an area where the laser beam has just passed is cooled by blowing carbon dioxide gas on the area, so that thermal stress disappears. By this, it is possible to form a groove only in the surface of the substrate.

It is desirable that the low rigidity area be formed by making use of multiphoton absorption by irradiation with a laser beam oscillating in pulses. In this case, the low rigidity area is formed as a crack in the substrate. By irradiating the substrate with the laser beam oscillating in pulses so that it is focused in the substrate, an altered layer is formed by multiphoton absorption in the substrate, so that the crack is formed.

According to the present invention, there is provided a method of producing an optical connector substrate including: temporarily mounting a substrate and an optical socket with hardening resin, the optical socket having a fitting hole that exposes a portion of the substrate; forming a portion of the hardening resin that is in the fitting hole into the shape of a lens by gathering the portion of the hardening resin at a portion, situated at the bottom portion of the fitting hole, of the substrate by inserting a lens die into the fitting hole of the optical socket; securing the optical socket to the substrate by hardening the hardening resin; forming a lens by hardening the portion of the hardening resin gathered at the substrate; and pulling out the lens die from the optical socket.

By virtue of such a structure, it is possible to form a lens using a lens die, the substrate, and the optical socket.

It is desirable that the fitting hole also be a guide groove to guide a mounting operation of an optical plug that supports one end of an optical fiber. By this, the guide groove of the optical socket is used as part of a molding die.

It is desirable that the hardening resin be a light-transmissive resin that is either a photocurable resin or a thermosetting resin. It is convenient for the substrate to be transparent because resin can be hardened by irradiating it with ultraviolet light. The resin may also be hardened using heat.

BRIEF DESCRIPTION OF THE DRAWINGS

FIGS. 5(a) to 5(e) are schematics that illustrate the steps of producing the optical transceiver;

FIGS. 14(a) and 14(b) are schematics that each illustrate an example of forming a lens by inserting a die into a hole of an optical socket;

FIG. 20 is a schematic that illustrates an optical connector used in the comparative example;

FIGS. 21(a) and 21(b) are schematics that illustrate a cutting stage used when cutting and dividing a substrate, and FIG. 21(c) is a schematic that shows a state of use thereof;

FIGS. 22(a) and 22(b) are schematics that illustrate the steps of scribing lines with a scriber using the cutting stage;

FIGS. 25(a) and 25(b) are schematics that illustrate the step of scribing lines in a glass substrate using a scriber prior to mounting optical sockets;

DETAILED DESCRIPTION OF PREFERRED EMBODIMENTS

A description of exemplary embodiments of the present invention is provided below with reference to the drawings.

Figure 1:
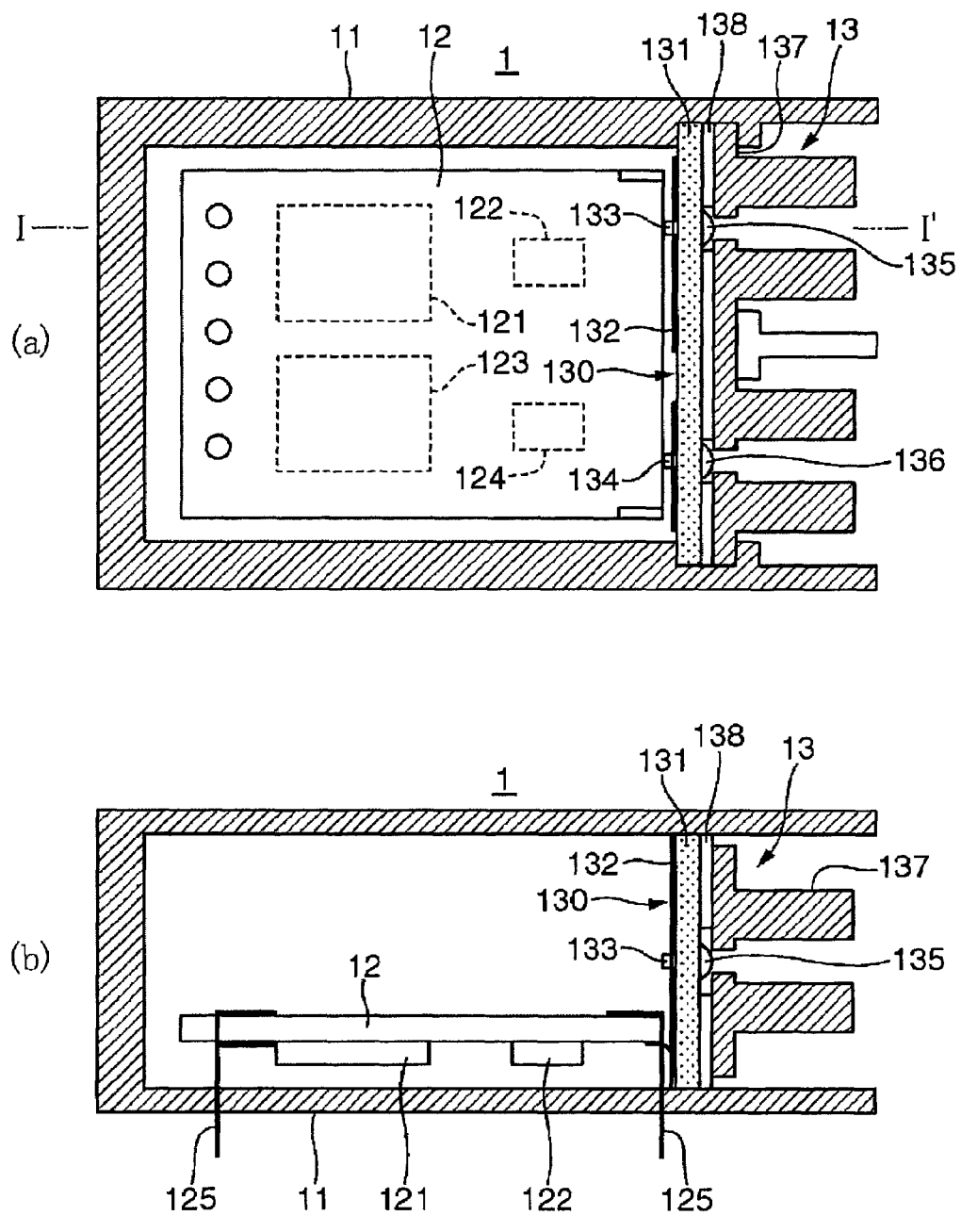
FIGS. 1(a) and 1(b) are schematics that each illustrate an optical transceiver of an exemplary embodiment of the present invention.

FIGS. 1(a) and 1(b) show a structure of an optical transceiver. FIG. 1(a) is a horizontal sectional view of the internal arrangement of an optical transceiver 1. FIG. 1(b) is a sectional view taken along plane I–I' in FIG. 1(a).

As shown in FIGS. 1(a) and 1(b), a signal processing substrate 12 and an optical coupling unit 13 are disposed in a housing 11 of the optical transceiver 1. A parallel-serial signal converting circuit 121, a drive circuit 122, an amplifying circuit 124, a serial-parallel signal converting circuit 123, a lead frame 125, etc., are disposed on the signal processing substrate 12. The parallel-serial signal converting circuit 121 converts an externally supplied parallel signal into a serial signal. The drive circuit 122 changes the serial signal to a drive signal of a light emitter 133. The amplifying circuit 124 shapes a light signal received by a light receiver 134 and amplifies the signal level. The serial-parallel signal converting circuit 123 converts the received light signal into a parallel signal. The lead frame 125 is used to connect and mount a wiring to, for example, a mother board (not shown).

The optical coupling unit 13 includes, for example, an optical circuit board 130, an optical socket 137, and a joining film 138. The optical circuit board 130 is formed by disposing a wiring film 132, the light emitter 133, the light receiver 134, coupling lenses 135 and 136, etc., on a transparent glass substrate 131. The optical socket 137 is connected to an optical plug that is disposed at one end of an optical fiber (not shown). The joining film 138 is used to mount the optical socket 137 to the optical circuit board 130. The optical socket 137 (or the optical coupling unit 13) and the optical plug form an optical connector (see FIG. 3).

Ordinarily, the inserting side is called a plug, and the receiving side is called a socket. In the description, one side (optical path side) of the connector is called the plug, and the other side (substrate side) of the connector is called the socket, so that the naming is not limited to whether the side is a male or a female side.

FIGS. 2(a) and 2(b) are enlarged views of the optical coupling unit 13 shown in FIGS. 1(a) and 1(b). FIG. 2(a) shows the optical coupling unit 13 viewed from the side of a plug insertion hole. FIG. 2(b) is a sectional view of the optical coupling unit 13. In FIGS. 2(a) and 2(b), corresponding parts to those shown in FIGS. 1(a) and 1(b) are given the same reference numerals, and are not described below.

The optical circuit board 130 includes the transparent substrate 131 to transmit a light signal, the wiring pattern 132 formed on the inner surface of the transparent substrate 131 (that is, the side of the transparent substrate 131 adjacent the inner portion of the housing), the light emitter 133 (or the light receiver 134) connected to the wiring pattern 132, and the coupling lenses 135 disposed at the outer surface (optical-plug-side surface) of the transparent substrate 131. The light emitter 133 is a surface emitting laser (VCSEL) for generating laser beams. The light receiver 134 (see FIG. 1(a)) is a photo detector for generating electric current in accordance with the quantity of light received by, for example, a phototransistor or a photodiode. Sleeves 137a of the optical socket 137 receive a cylindrical ferrule 202 (see FIG. 3) that holds the optical fiber disposed at the optical plug and is annular or cylindrical. An opening 137c is formed in the center of the bottom portion defining the fitting holes 137b formed in the respective sleeves 137a used for guiding the insertion of the ferrule. The coupling lenses 135 (or 136) on the substrate 131 are exposed at the opening 137c. The fitting holes 137b pass through the optical socket 137.

Figure 3:
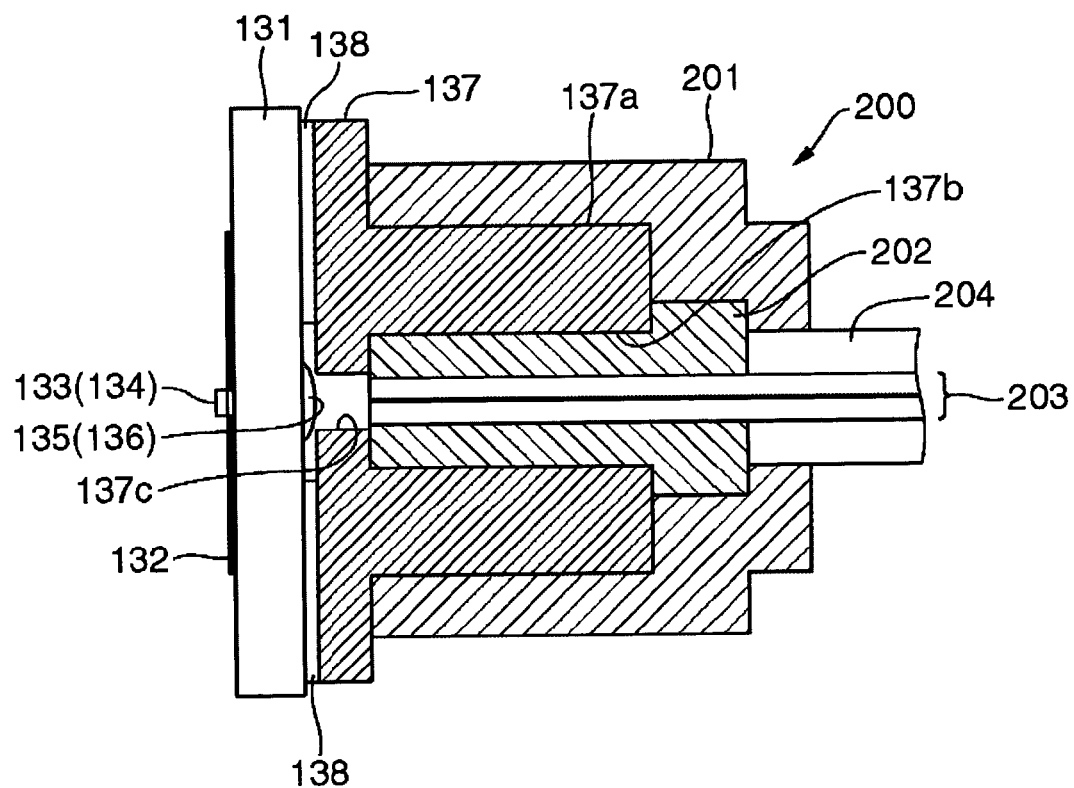
FIG. 3 is a schematic that illustrates a state in which the optical socket and an optical plug are connected.

FIG. 3 shows a state in which an optical plug 200 is mounted to the optical socket 137. The cylindrical ferrule 202 of the optical plug 200 is inserted in the cylindrical sleeves 137a of the optical socket 137, and is protected by a plug housing 201. The optical socket 137 and the optical plug 200 are secured to each other by a stopping device (not shown). The stopping device includes, for example, an engageable and disengageable hook and a stud. The hook is disposed at the plug housing 201 and the stud is disposed at the optical socket 137 and engages the hook. The ferrule 202 holds an end portion of an optical fiber 203. By inserting the ferrule 202 into the cylindrical inner portion of the sleeves 137a, the central axis (optical axis) of the optical fiber 203 is held on the central axis of this cylindrical inner portion. A line portion of the optical fiber 203 is protected by a coating 204. Light from a core of the optical fiber 203 passes through the coupling lenses 136 (disposed at the opening 137c at the bottom portion of the sleeves 137a) and the transparent substrate 131 and is focused on the light receiver 134. The light from the light receiver passes through the transparent substrate 131 and the coupling lenses 135 and is focused on the core at an end portion of the optical fiber 203.

Figure 4:
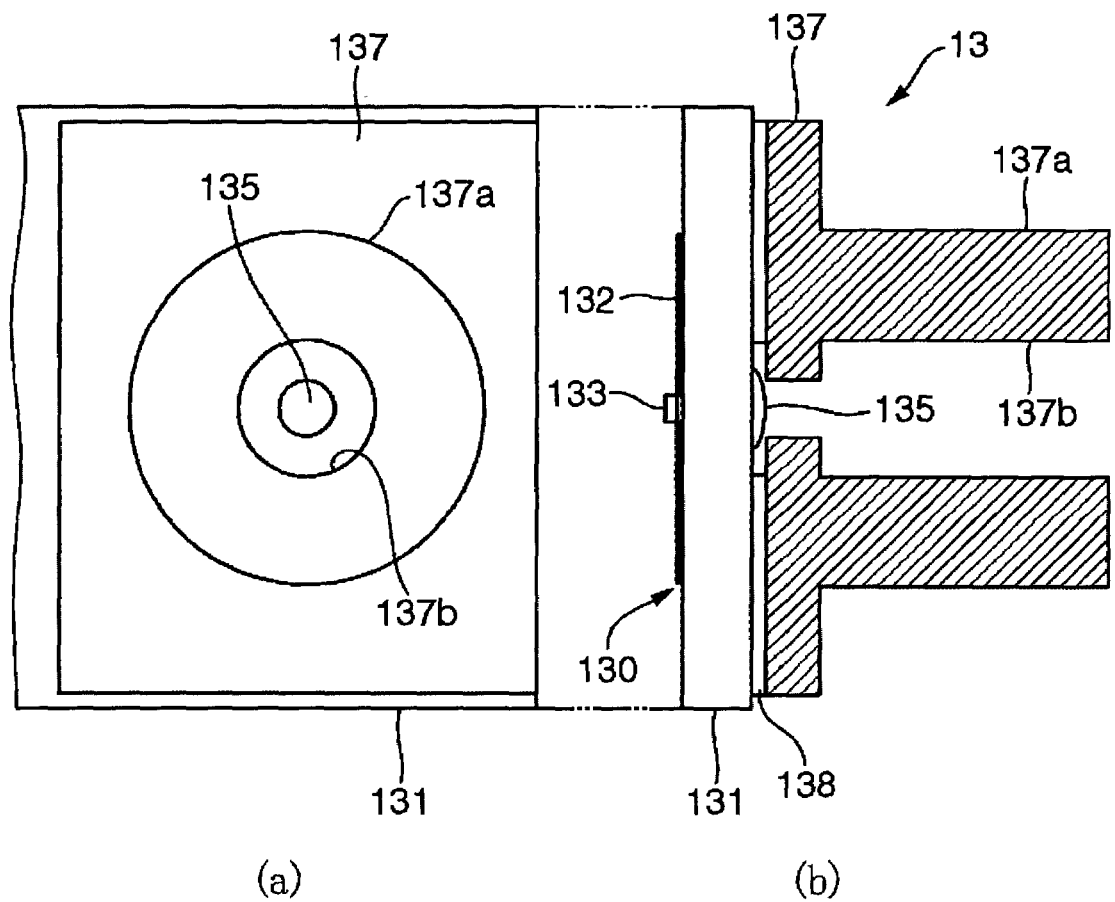
FIGS. 4(a) and 4(b) are schematics that each illustrate an optical socket having one set of terminals.

FIGS. 4(a) and 4(b) illustrate another optical coupling unit (optical connector) 13. In FIGS. 4(a) and 4(b), corresponding parts to those shown in FIGS. 2(a) and 2(b) are given the same reference numerals, and are not described below.

In the example shown in FIGS. 2(a) and 2(b), separate optical fibers are used for transmission and reception, and one optical connector connects two optical fibers. In the example shown in FIGS. 4(a) and 4(b), one optical coupling unit (optical connector) is used for a transmitting or receiving optical fiber or a transmitting-and-receiving optical fiber.

Next, a method of producing the above-described optical transceiver is described below with reference to the relevant figures. FIGS. 5(a) to 5(e) illustrate the steps of producing the optical transceiver of the exemplary embodiment.

First, in order to produce the optical circuit board 130, as shown in FIG. 5(a), a glass substrate 131 is provided as a light-transmissive substrate. Then, an electrically conductive material, such as aluminum or copper, is deposited on a surface of the glass substrate 131 by, for example, sputtering or electroforming, thereby forming a metallic (electrically conductive) film. The metallic film is subjected to patterning in accordance with a desired circuit, so that a wiring film 132 is formed.

Figure 7:
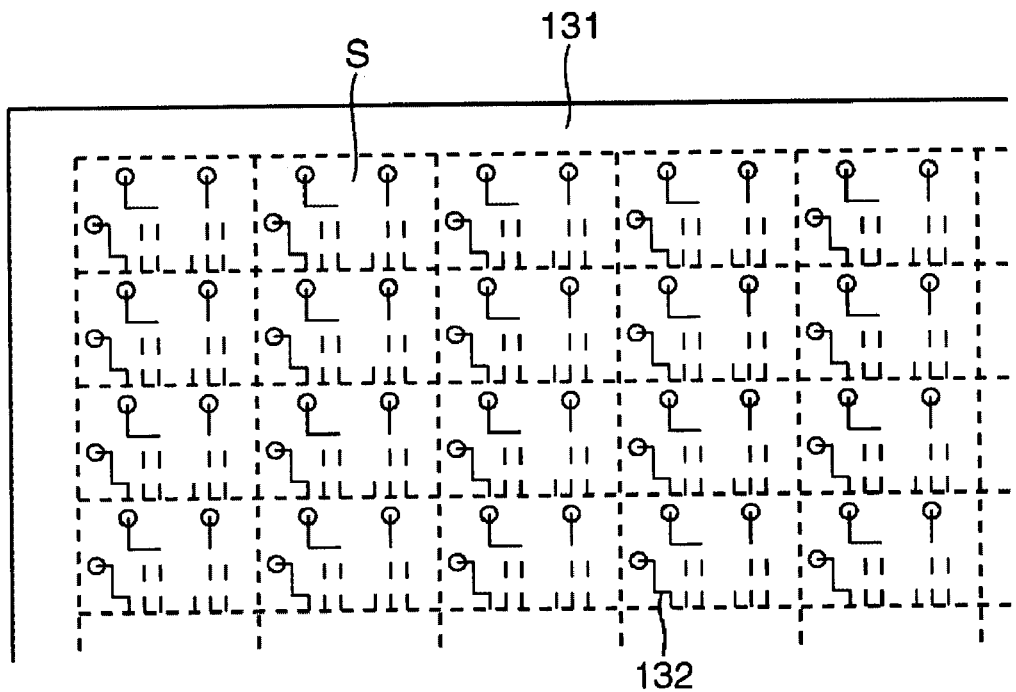
FIG. 7 is a schematic that illustrates an example of wiring patterns that are formed on a substrate.

FIG. 7 shows an example, in which a plurality of the metallic wiring film patterns 132 are formed in correspondence with sub-areas S of the glass substrate 131. In the step shown in FIG. 5(a), as shown in FIG. 7, forming unit wiring films (wiring patterns) all together at corresponding locations on one surface of the glass substrate 131 is desirable from the viewpoint of mass production.

Next, as shown in FIG. 5(c), a light emitter 133 (or a light receiver 134) and other circuit elements, such as integrated-circuit elements, are mounted to the one surface of the glass substrate 131. The mounting may be carried out by, for example, flip chip bonding, wire bonding, or solder reflowing. As shown in FIG. 7, when the unit wiring patterns are formed all together on the glass substrate 131, in the step shown in FIG. 5(c), a plurality of optical elements (light emitters 133 or light receivers 134) are disposed on the one of surface of the glass substrate 131 in correspondence with the unit wiring patterns.

As shown in FIG. 5(d), a coupling lens 135 (or 136) is formed on a location on the other surface of the glass substrate 131 in correspondence with the location of the light emitter 133 (or the light receiver 134). The coupling lens 135 (136) may be formed, for example, by joining together lens-shaped materials and making use of surface tension of hardening liquid resin, or by using a lens die and the 2P method. In this way, the optical circuit board 130 is produced. As shown in FIG. 7, when the unit wiring patterns are formed all together on locations of the glass substrate 131, in the step shown in FIG. 5(d), a plurality of the lenses 135 (or 136) are disposed on the other surface of the glass substrate 131 in correspondence with the locations of the optical elements.

When low rigidity areas are formed by, for example, scribing lines along cutting lines W (see FIG. 8), prior to forming the lenses after mounting the circuit elements (such as the light emitters) or prior to mounting the optical socket after forming the lenses, the substrate is processed to form the low rigidity areas. The method of forming the low rigidity areas is described below in more detail later.

Next, as shown in FIG. 5(e), an optical socket 137 is mounted to the optical circuit board 130. An adhesive is applied to opposing surfaces of the optical socket 137 and the glass substrate 131, or to either opposing surface in order to mount the optical socket 137 to the optical circuit board 130. The optical socket 137 is disposed so that the central axis of a cylindrical fitting hole 137b of a sleeve 137a substantially coincides with the center of the lens 135 (or 136) and the light emitter 133 (or the light receiver 134).

The optical socket 137 and the optical circuit board 130 may be roughly aligned by watching the position of a marker (not shown) or lens on the circuit board 130.

As shown in FIG. 6(a), the optical socket 137 and the optical circuit board 130 are precisely aligned.

Figure 6:
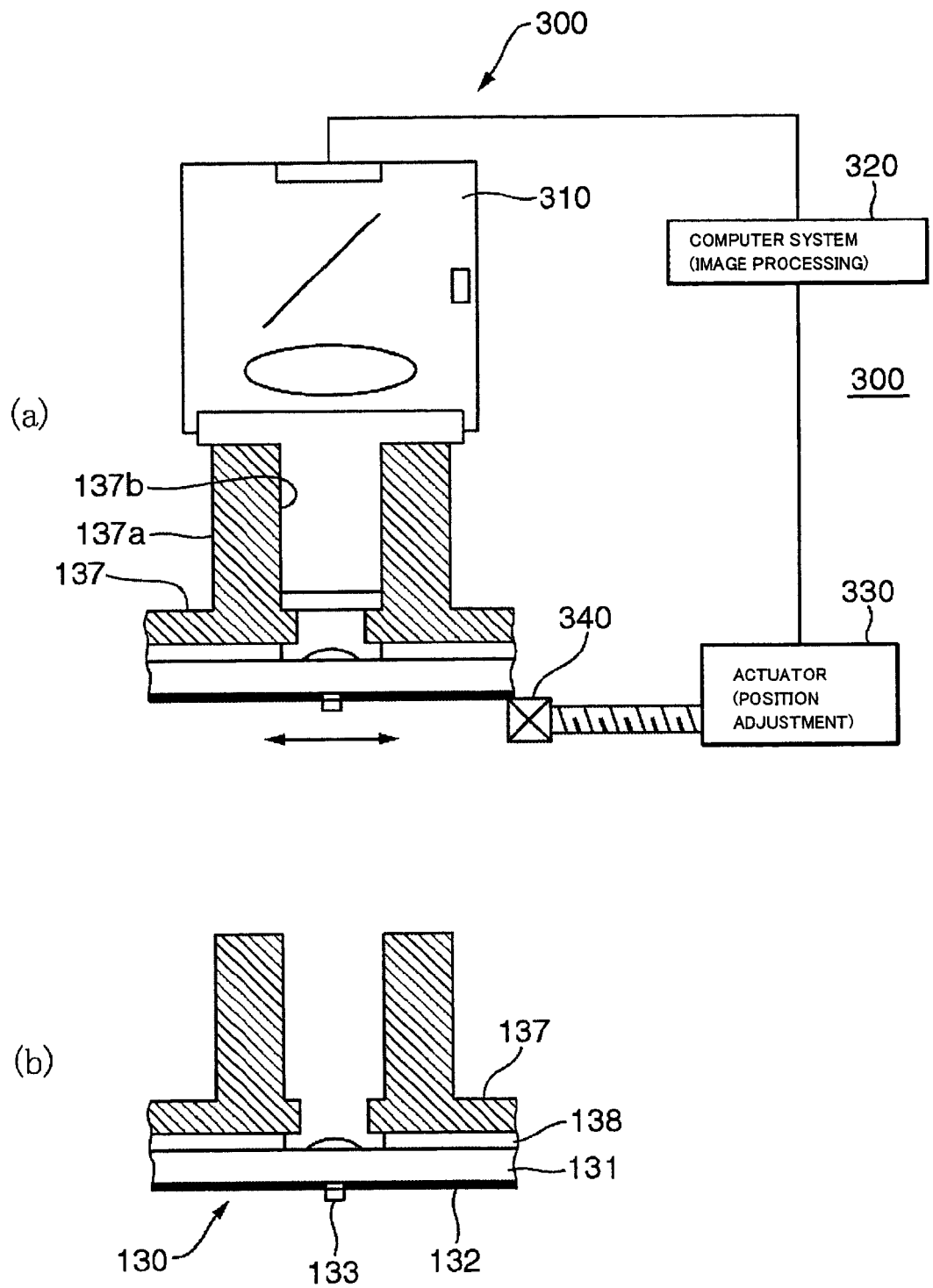
FIGS. 6(a) and 6(b) are schematics that illustrate the step of adjusting the position of an optical socket in the process of producing the optical transceiver.

FIG. 6(a) shows an example of a suitable position adjustor for precisely aligning the optical socket 137 and the optical circuit board 130. For precise alignment, for example, a position adjustor 300 shown in FIG. 6 is used. The position adjustor 300 includes, for example, an optical head 310 to read an object and an alignment mark (described below), a computer system 320 to detect any positional displacement between the alignment mark and the object by image processing, an actuator 330 that is driven so that the displacement is compensated for by the computer system 320, and an arm (stage), mounted to the actuator, to transport the glass substrate 131 or the optical head 310 to its mounting position. The ferrule (reading section) is inserted into the fitting hole 137b of the optical socket 137 in order for the optical head 310 to read, for example, the alignment mark indicating the central position of the fitting hole 137b and the object, such as a particular circuit pattern or adjustment mark on the substrate.

Based on the read result, the optical socket 137 and the optical circuit board 130 are aligned (finely adjusted) so that the central axis of the fitting hole 137b of the optical socket 137 is aligned with the central position (optical axis) of the coupling lens 135 and the optical element (or the coupling lens 136 and the optical element 134). When the optical socket 137 is mounted to the optical plug 200, the core of the optical fiber 203 that is supported by the ferrule 202 is positioned on the central axis of the fitting hole 137b. The position adjustor 300 is described in more detail below.

As shown in FIG. 6(b), after the optical socket 137 and the optical circuit board 130 have been aligned, an adhesive 138 is hardened in order to secure the optical socket 137 to the optical circuit board 130. The adhesive 138 may be, for example, a photocurable resin or a thermosetting resin.

Figure 8:
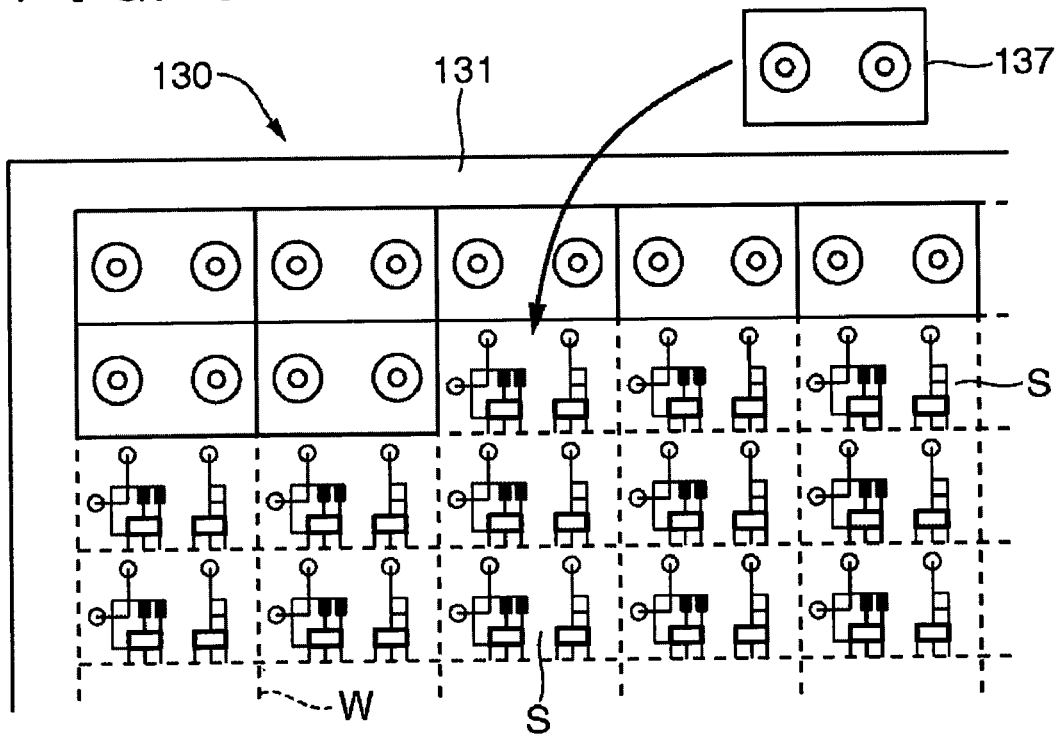
FIG. 8 is a schematic that illustrates an example of mounting a plurality of the optical sockets to the substrate.

The steps shown in FIGS. 5(e), 6(a), and 6(b) are repeated a required number of times, and, as shown in FIG. 8, a plurality of the optical sockets 137 are mounted to respective sub-areas S of the optical circuit board 130, so that optical transceivers are assembled. In this way, the assembled circuit board 130 are cut along cutting lines W the sub-areas S, so that individual optical transceivers are produced.

FIGS. 21(a) and 21(b) show a suitable example of a cutting stage used in cutting and dividing the optical circuit board 130 into the sub-areas S, and FIG. 21(c) shows the state of use of the cutting stage. FIG. 21(a) is a plan view. FIG. 21(b) is a sectional view taken along plane I–I'. FIG. 21(c) shows a state in which the optical circuit board 130 is placed on a cutting stage 600. The cutting stage 600 has holes 601 in correspondence with the sub-areas S of the optical circuit board 130. The optical circuit board 130 is placed on the cutting stage 600 so that sleeves 137a of a plurality of the optical sockets 137 fit in their respective holes 601. By making the inside of each hole 601 substantially vacuous by reducing the pressure in each hole 601, the optical circuit board 130 is attached to the cutting stage 600.

FIGS. 22(a) and 22(b) illustrate scribing lines with a scriber using the cutting stage 600. As shown in FIGS. 22(a) and 22(b), with the optical circuit board 130 being placed on the cutting stage 600, scribe lines 603 are formed using the scriber on the surface of the optical circuit board 130 opposite to the surface to which the optical sockets 137 are mounted. A blade 602 of the scriber is formed of a hard material, such as a hard alloy or diamond. With the blade 602 being pushed against the optical circuit board 130, while scanning the optical circuit board 130 in the X and Y directions, lines are scribed along the cutting lines (intended cutting lines) W. Any piece of glass that is produced as a result of forming the lines is removed by, for example, nitrogen blowing. After forming the scribe lines 603, the optical circuit board 130 is removed from the cutting stage 600, and the optical circuit board 130 are cut along the scribe lines 603 into the sub-areas S.

The optical circuit board 130 that is placed on the cutting stage 600 may be divided using laser beams. For example, after forming an initial crack by irradiating a cutting starting point with laser beams using a femtosecond laser, the optical circuit board 130 is scanned using a $CO_2$ laser along the cutting lines W in the X and Y directions. By the scanning, the initial crack is increased in size by thermal stress that has been produced by irradiating the optical circuit board 130 with the $CO_2$ laser, so that the optical circuit board 130 is cut.

If the optical circuit board 130 is to be cut in the Y direction after being cut in the X direction, when scanning the optical circuit board 130 with a laser beam in the Y direction, each time the laser beam reaches a cutting line in the X direction, the optical circuit board 130 is irradiated using the femtosecond laser again in order to form an initial crack. By this, it is possible to cut the optical circuit board 130 in a direction perpendicular to an already cut portion along a cutting line because the cracks can be increased in size continuously.

Figure 23:
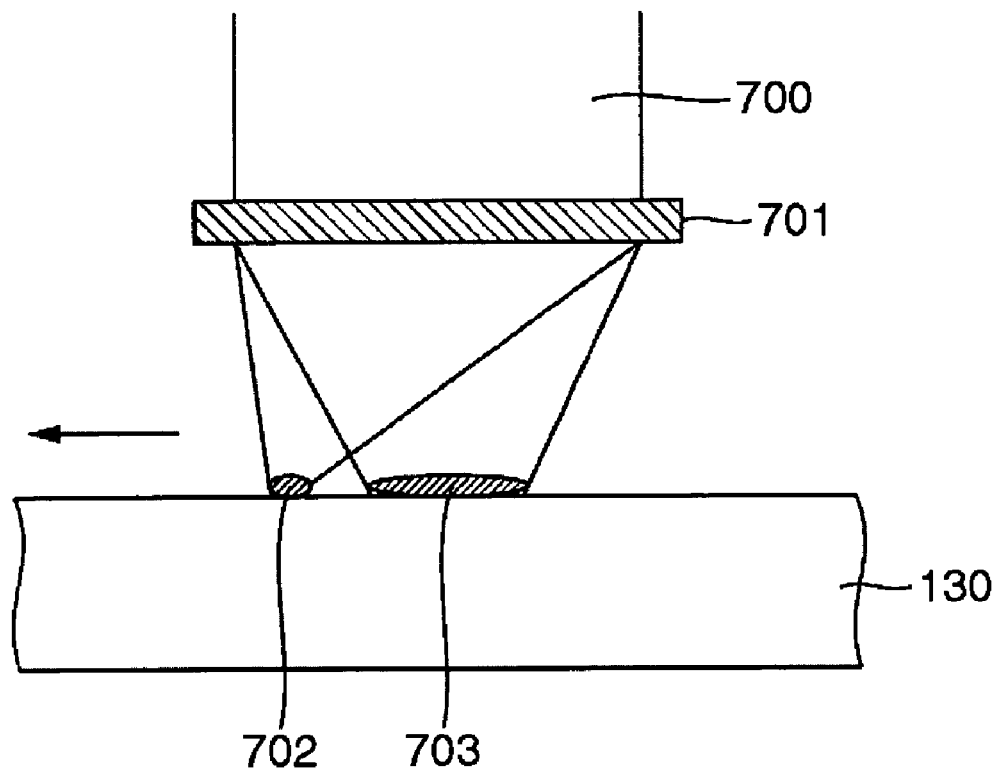
FIG. 23 is a schematic that illustrates an example of branching a laser beam using a diffraction grating.

As shown in FIG. 23, it is also possible to branch a $CO_2$ laser beam using a diffraction grating 700 into a first beam 702 and a second beam 703, to form an initial crack by irradiation with the first beam 702, and to increase the size of the initial crack by generating thermal stress by irradiation with the second beam 703. The arrow shown in FIG. 23 represents the direction of travel of the laser beams used to irradiate the optical circuit board 130.

Figure 24:
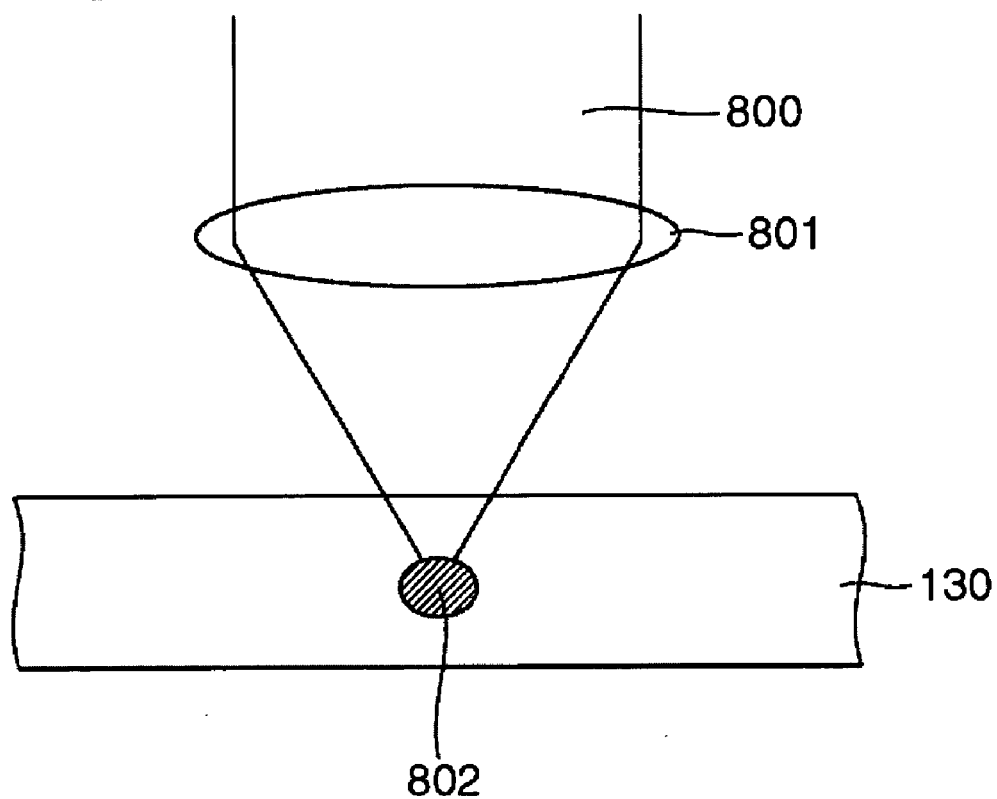
FIG. 24 is a schematic that illustrates an example of forming an altered layer in a substrate by multiphoton absorption by focusing a laser beam in the substrate using a condenser lens.

It is also possible to cut and divide the optical circuit board 130 by making use of multiphoton absorption resulting from irradiation using a pulse laser. It is desirable to use a YAG laser or a femtosecond laser having very strong pulse oscillations. As shown in FIG. 24, while focusing a laser beam 800 in the optical circuit board 130 using a condenser lens 801, the optical circuit board 130 is scanned along the intended cutting lines in the X and Y directions. By this, an altered layer 802 is formed in the optical circuit board 130 by multiphoton absorption. When the altered layer reaches the surfaces of the optical circuit board 130, the optical circuit board 130 is cut.

Methods of forming a low rigidity area in the glass substrate 131 of the optical circuit board 130 include scribing lines using a scriber, scribing lines by irradiation using a laser, and forming cracks in the circuit board by making use of multiphoton absorption resulting from irradiation using a laser. These methods are described in more detail below.

FIGS. 25(a) and 25(b) illustrate steps of forming a low rigidity area in the glass substrate 131. FIG. 25(a) is a plan view, and FIG. 25(b) is a sectional view taken along plane I–I' in FIG. 25(a). A blade 901 of a scriber is formed of a hard material, such as hard alloy or diamond. While scanning the glass substrate 131 in the X and Y directions, scribe lines 902 are formed in the glass substrate 131. For positioning the glass substrate on the scriber, it is possible to use as an alignment mark, for example, the shape of a light-emitting portion of a light emitter 133 or the shape of a light-receiving portion of a light receiver 134, an alignment mark that is provided for mounting a light emitter 133 or a light receiver 134, an electrode, a wiring pattern, or a mounted part.

After forming the scribe lines, optical sockets 137 are joined to the glass substrate 131 at the same time. Therefore, the low rigidity area is formed under a condition where microcracks are less easily formed (when a borosilicate glass having a diameter of 150 mm and a thickness of 0.7 mm is used, the pushing amount is 0.10 mm, cutting speed is 100 cm/s, and cutting pressure is 1.5 kg) than an ordinary scribe condition (when a borosilicate glass having a diameter of 150 mm and a thickness of 0.7 mm is used, the pushing amount is 0.15 mm, cutting speed is 25 cm/s, and cutting pressure is 2.0 kg). Any piece of glass that is produced is removed by, for example, nitrogen blowing.

Figure 26:
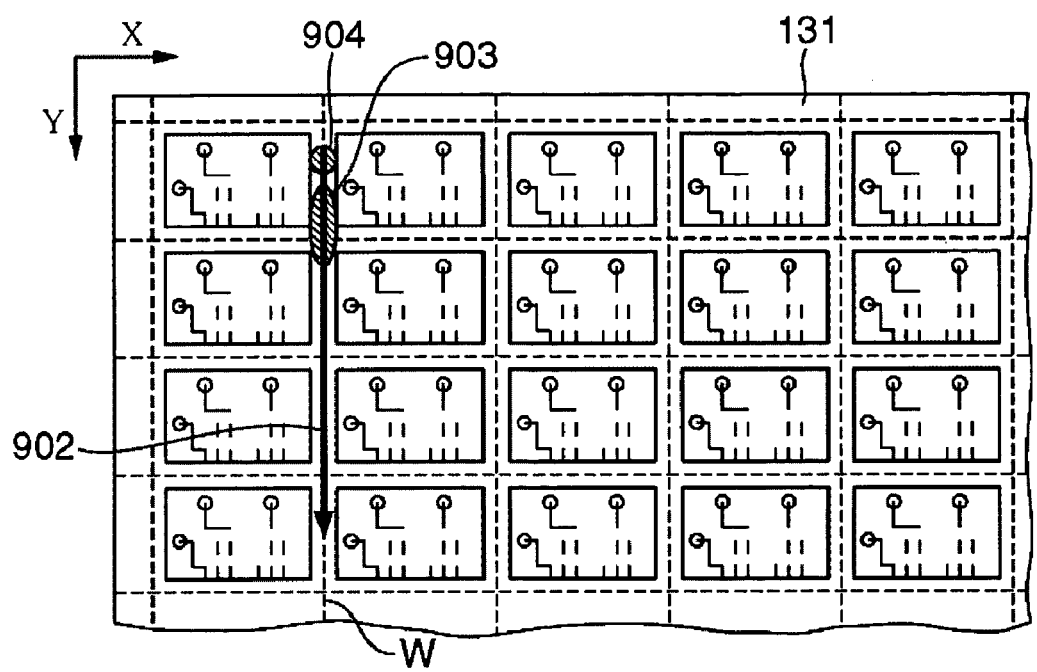
FIG. 26 is a schematic that illustrates an example of scribing lines prior to mounting the optical sockets by irradiating the substrate with a laser beam and cooling the substrate with carbon dioxide gas immediately after irradiating it with the laser beam.

FIG. 26 shows scribing lines using a laser beam. After forming an initial crack by irradiating a cutting starting point by a femtosecond laser, the optical circuit board 131 is scanned along cutting lines W in the X and Y directions using a CO2 laser, and the initial crack is increased in size by thermal stress that has been generated by irradiating the optical circuit board 131 using the laser. In order to prevent the glass substrate 131 from being cut to the back side by the scribe lines, carbon dioxide gas is blown onto an area 904 where a CO2 laser beam 903 has just passed to immediately cool the area 904.

As shown in FIG. 23, it is also possible to branch a CO2 laser beam 700 using the diffraction grating 701 into a first beam 702 and a second beam 703, to form an initial crack by irradiation with the first beam 702, and to increase the size of the initial crack by generating thermal stress by irradiation with the second beam 703.

When cracks are formed in the substrate 131 by making use of multiphoton absorption resulting from irradiation with a laser beam, a YAG laser, a femtosecond laser, or the like, is used. As shown in FIG. 24, while focusing a laser beam 800 in the glass substrate 131 using a condenser lens 801, the glass substrate 131 is scanned along intended cutting lines in the X and Y directions. By this, an altered layer 802 is formed in the glass substrate 130 by multiphoton absorption.

Using the glass substrate 131 having a low rigidity area formed by the above-described method, the steps shown in FIGS. 5(e), 6(a), and 6(b) are repeated a required number of times. As shown in FIG. 8, the optical sockets 137 are mounted to the corresponding sub-areas S of the substrate 131, so that optical transceivers are assembled. The optical circuit board 130 that has been assembled in this way is cut and divided along the low rigidity area into the sub-areas S.

Figure 2:
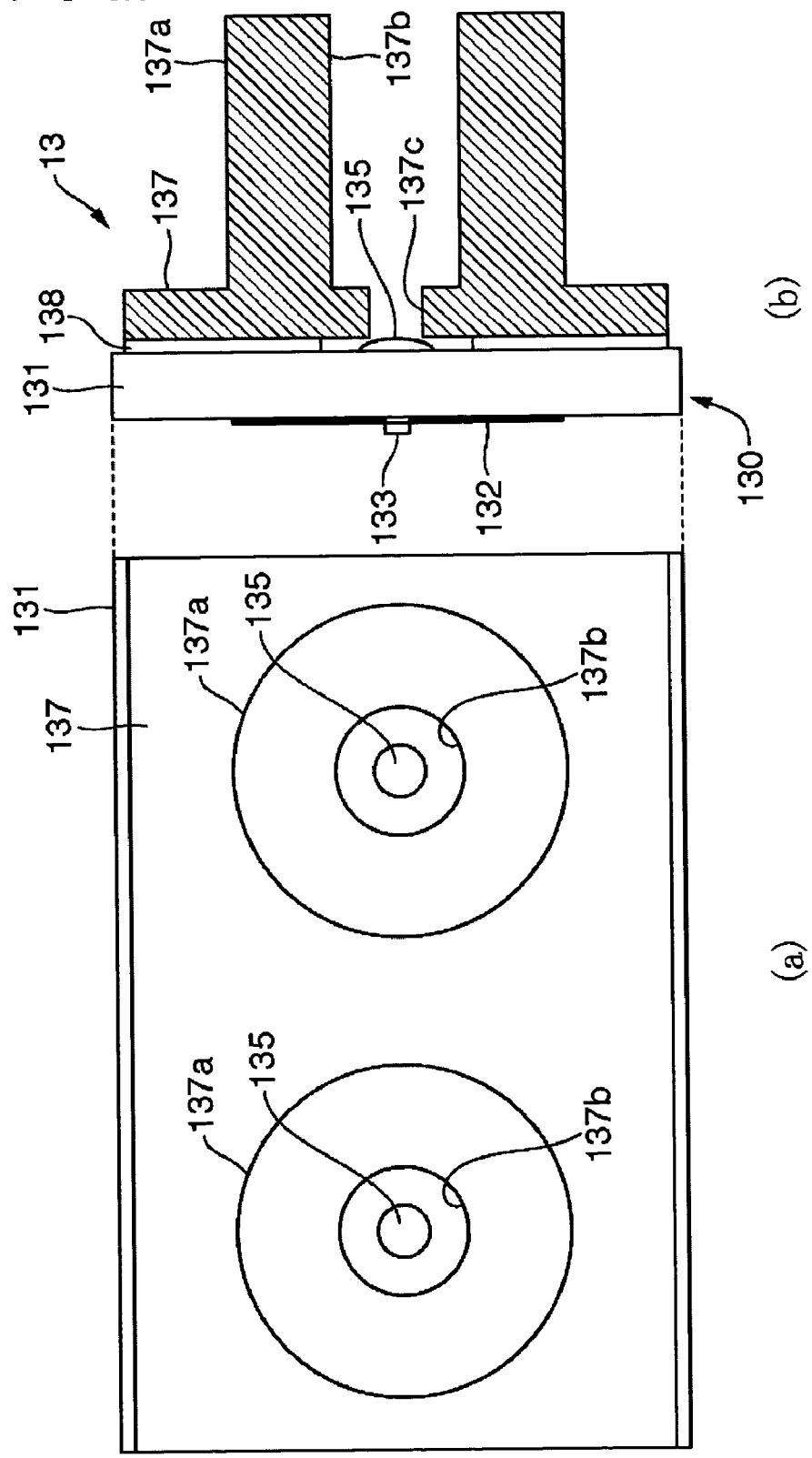
FIGS. 2(a) and 2(b) are schematics that each illustrate an optical socket having two sets of terminals.
Figure 9:
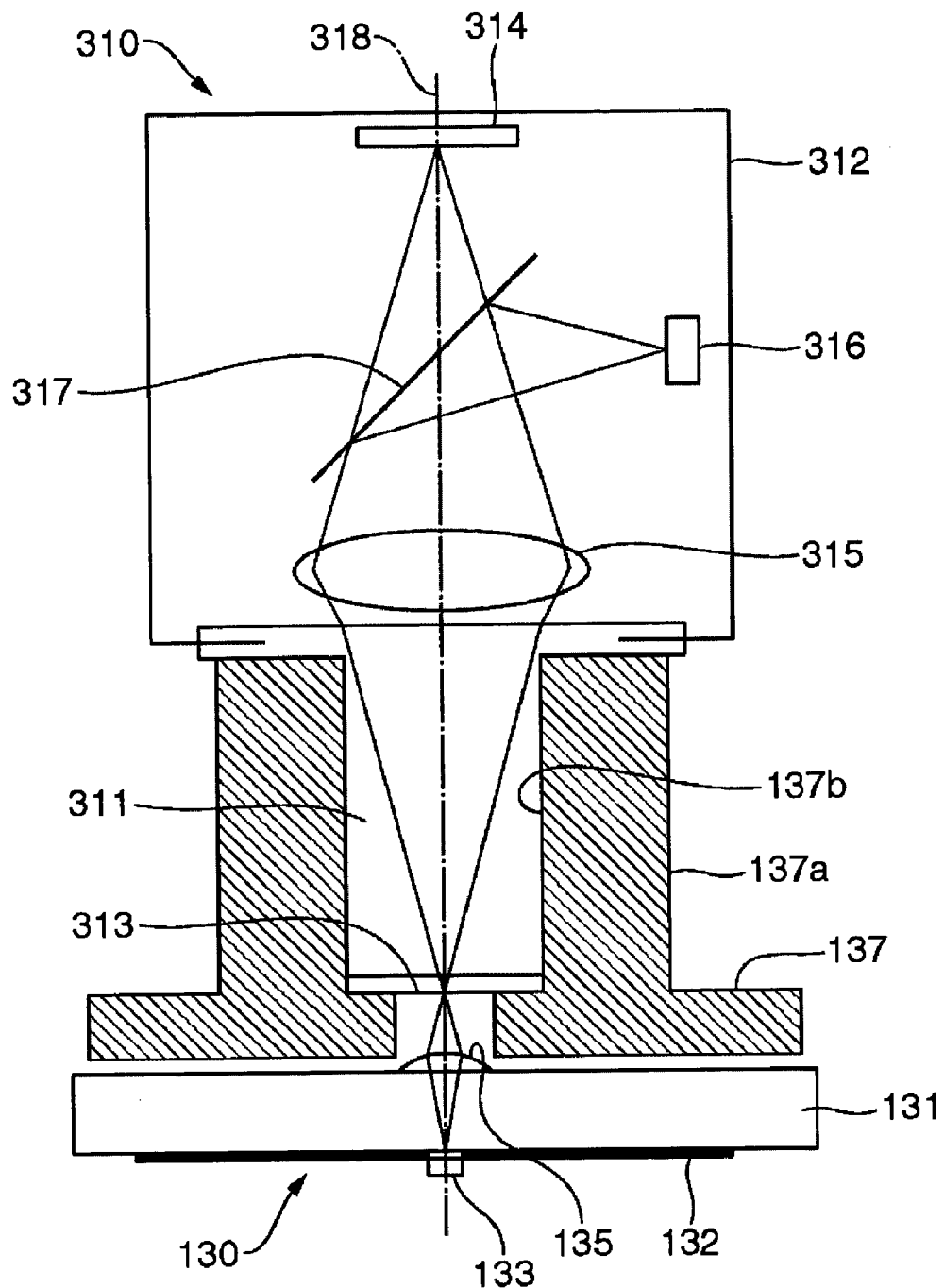
FIG. 9 is a schematic that illustrates an example of an optical head.

FIG. 9 shows an example of an adjustor (optical head) designed to adjust the mounting position of an optical socket 137. In FIG. 9, corresponding parts to those shown in FIG. 2 are given the same reference numerals, and are not described below.

An optical head 310 includes a cylindrical ferrule 311 and a housing 312. The ferrule 311 is inserted in a hole (guide groove) 137b of a sleeve 137a of an optical socket 137 and transmits light. The housing 312 is disposed on the top end of the ferrule 311. A ferrule alignment mark 313 is formed at the bottom end of the ferrule 311. A charge-coupled device (CCD) 314, a lens 315, an illumination light source 316, and a half mirror 317 are disposed in the housing 312. The CCD 314 is an image pickup device to read a mark. The lens 315 forms on the CCD 314 a reading image of the ferrule alignment mark 313 or a substrate alignment mark (see FIG. 10). The illumination light source 316 is, for example, a light emitting diode (LED) or a mercury lamp to illuminate the bottom end surface side of the ferrule 311 when necessary. The half mirror 317 guides light from the illumination light source 316 towards the ferrule 311.

By such a structure, the bottom portion of the fitting hole 137b of the sleeve 137a is illuminated by the illumination light source 316. The image at the bottom portion as well as the ferrule alignment mark 313 is read by the CCD 314.

Figure 10:
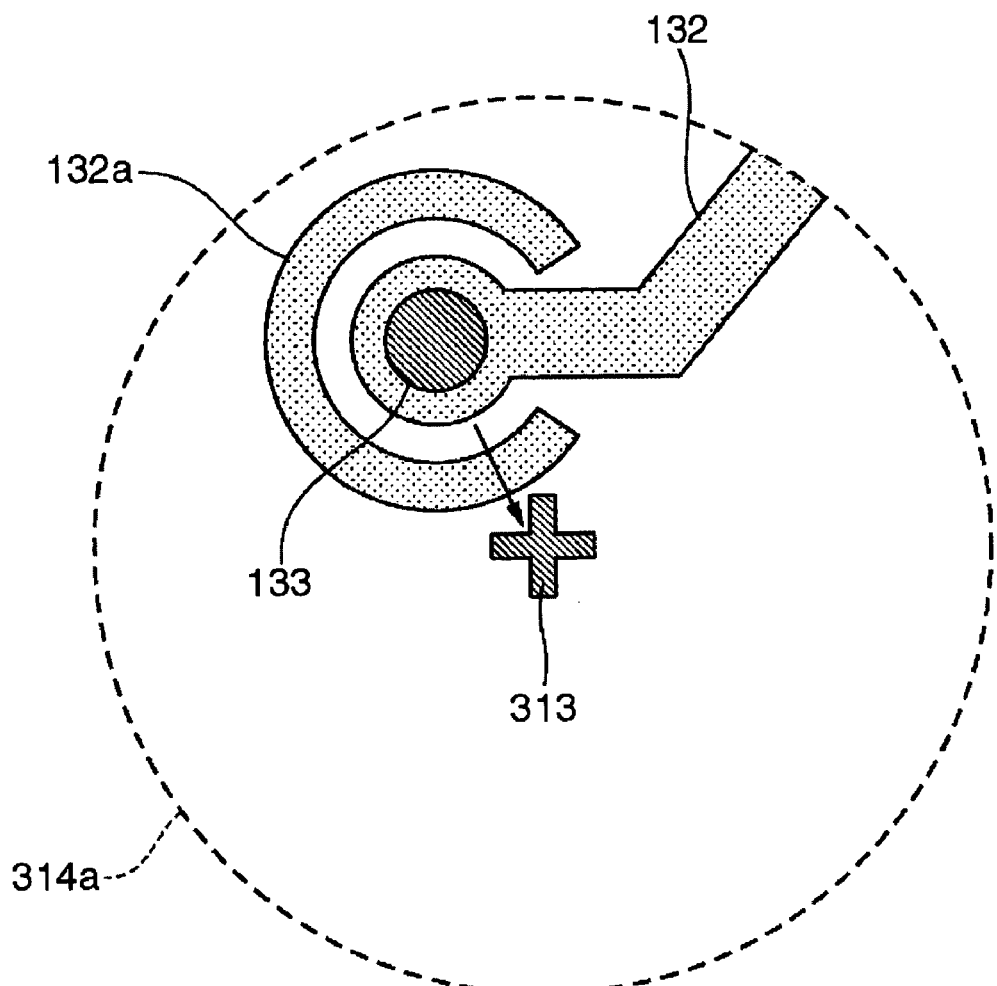
FIG. 10 is a schematic that illustrates an example of an image read by an image pickup device.

A description of adjusting the mounting position of the optical socket 137 using such an optical head 310 is provided below. First, the ferrule 311 of the optical head 310 is inserted into the sleeve 137a without any gap therebetween. By this, a photographic image, such as that shown in FIG. 10, is produced by the CCD 314. The ferrule alignment mark 313 is positioned at the center of the fitting hole 137b (that is, the center of the bottom end surface of the cylindrical portion of the ferrule 311) or the center of a screen 314a. As described above, the illumination light source 316 illuminates the bottom portion defining the fitting hole 137b, an alignment mark 132a on a surface emitting laser 133, and the ferrule alignment mark 313. Examples of the alignment mark 132a include, in addition to an alignment mark that is specially provided to adjust the mounting of the optical socket 137, the shape of a light-emitting portion of the light emitter 133, the shape of a light-receiving portion of a light receiver 134, an alignment mark that is provided to mount the light emitter 133 or the light receiver 134, an electrode, a wiring pattern, and a mounted part. Such alignment marks are photographed by the CCD 314 as objects to be photographed. Light that has impinged upon each alignment mark is reflected, and enters and is focused by the lens 315, so that an image of each alignment mark is formed on the CCD 314. The CCD 314 converts each alignment mark image into an image signal by arranging a plurality of reading pixels. The computer system 320 subjects each signal to image processing, and determines the position of each alignment mark in order to move the optical socket 137 relative to the circuit board 130 so that both alignment marks overlap (see FIG. 6(a)). In the example shown in FIG. 10, the optical circuit board 130 and the optical socket 137 are moved relative to each other as appropriate, so that the center of the C-shaped alignment mark 132a on the circuit board overlaps the ferrule alignment mark 313. Thereafter, the adhesive 138 is hardened. If the optical socket 137 has a plurality of slits 137a and is connected to a plurality of optical fibers, when the aforementioned alignment is carried out using holes 137b of the sleeves 137a, the mounting positions of the optical sockets at a plurality of optical fiber terminals can be adjusted.

In this way, it is possible to align an optical element 133 (or 134), a coupling lens 135 (or 136), and an optical fiber 203 on one optical axis 318. Therefore, it is possible to reduce connection loss in the optical connector. The above-described method of adjustment can be applied to the case of mounting an optical socket to a related can package.

There are various other structural examples of the optical head 310. These other structural examples of the optical head 310 are described below with reference to the relevant drawings.

Figure 11:
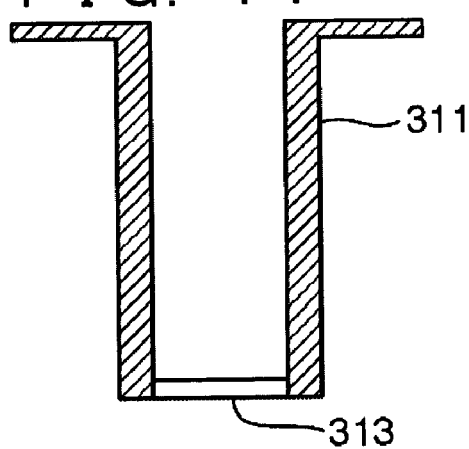
FIG. 11 is a schematic that illustrates another structure of a ferrule of the optical head (that is, a cylindrical structure)

FIG. 11 illustrates another structural example of the ferrule 311 of the optical head 310. In addition to being a cylindrical member as shown in FIG. 9, it may also be a hollow cylindrical member as shown in FIG. 11.

Figure 12:
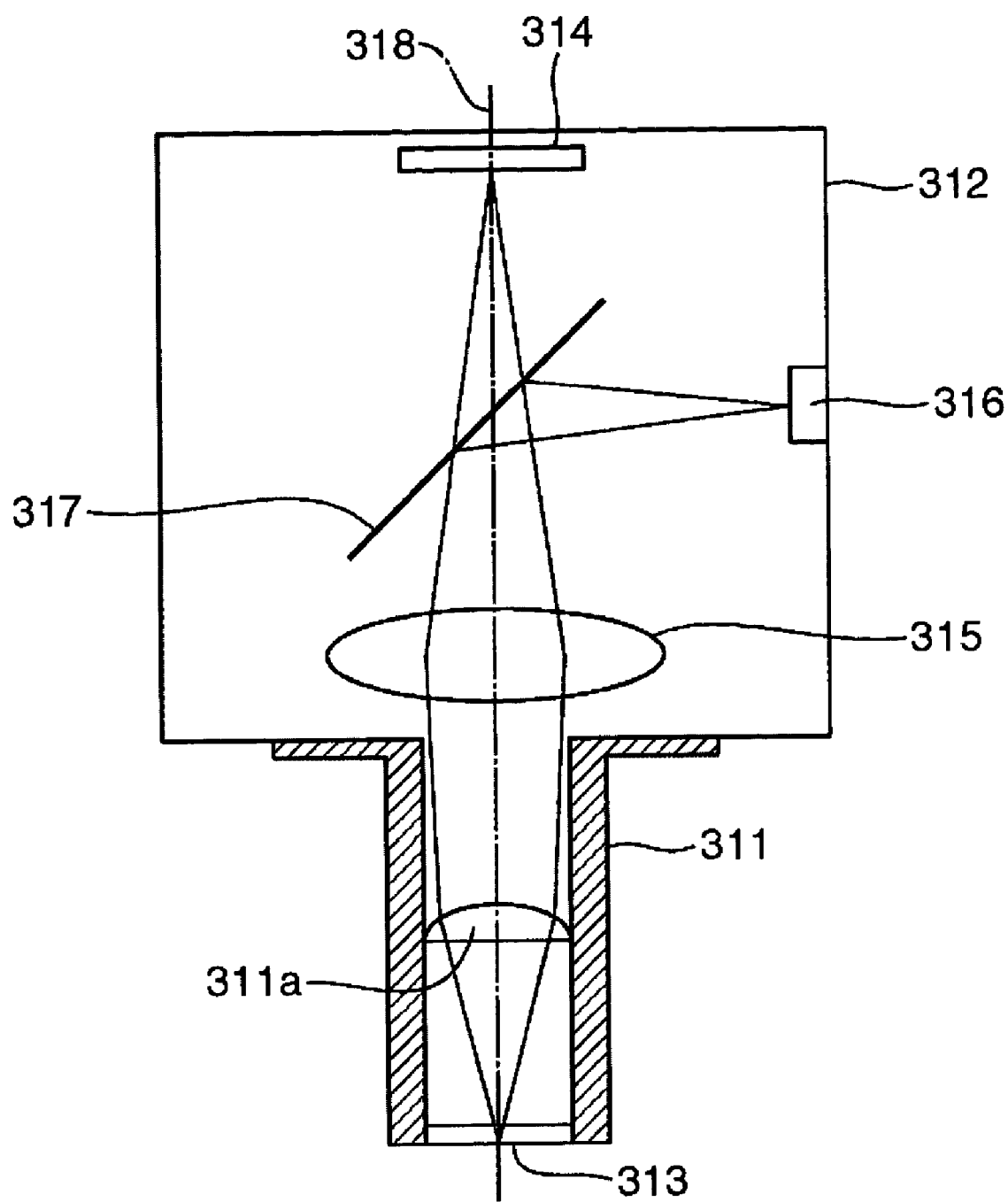
FIG. 12 is a schematic that illustrates another structure of the ferrule of the optical head (that is, a structure incorporating a lens)

FIG. 12 illustrates still another structural example of the ferrule 311 of the optical head 310. In FIG. 12, corresponding parts to those shown in FIG. 9 are given the same reference numerals, and is not described below. In this example, a small lens 311a is further disposed in the ferrule 311 (which is a hollow cylindrical member). The lens 311a converts light reflected from an alignment mark 313 and a circuit board 130 into light parallel to an optical axis 318 of a lens 315, so that the quantity of light that impinges upon a CCD 318 is increased. This means that the numerical aperture NA of the optical system is equivalently increased, so that the quality of a photographed image can be enhanced.

Figure 13:
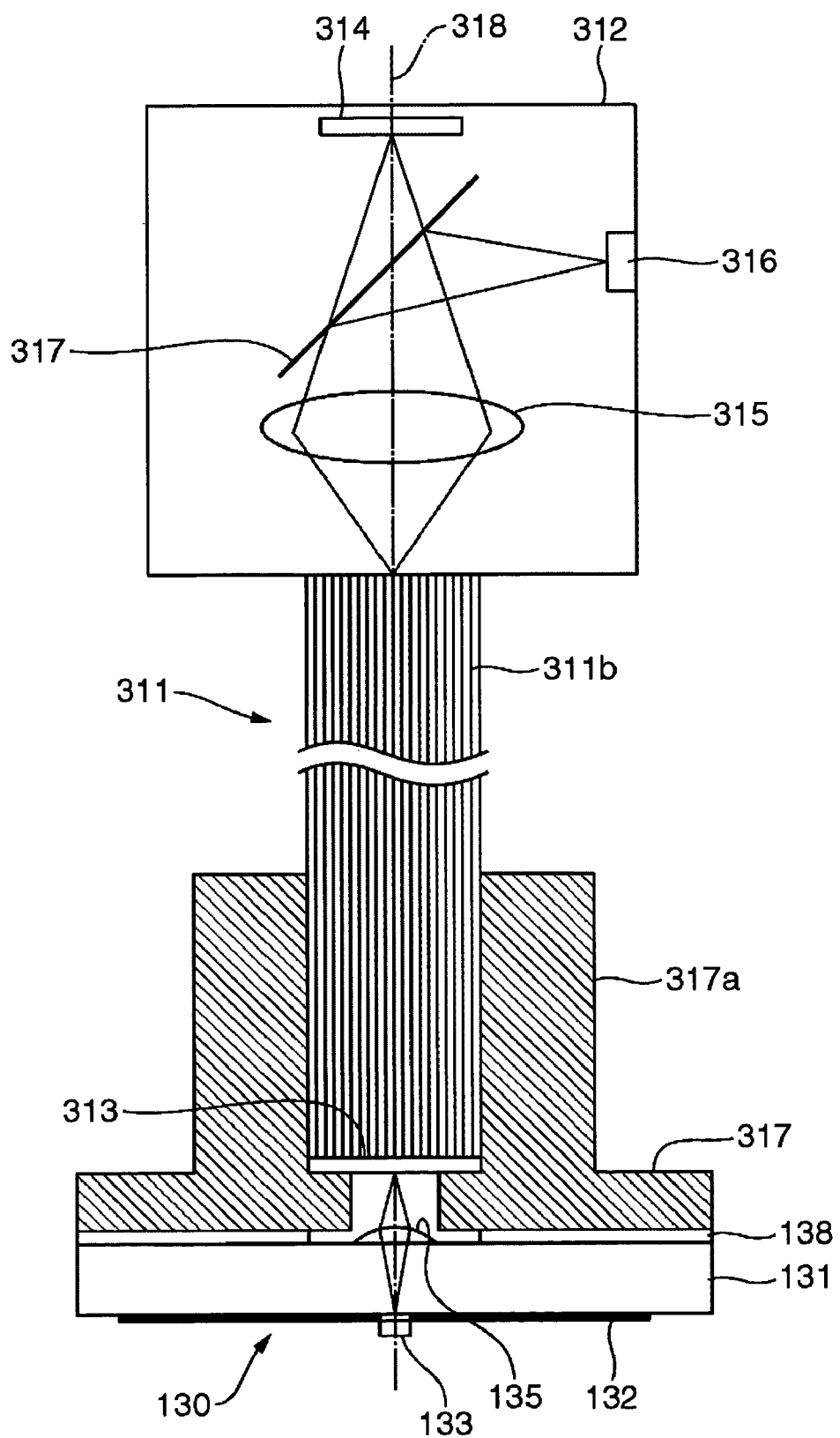
FIG. 13 is a schematic that illustrates another structure of the ferrule of the optical head (that is, a structure using an optical fiber)

FIG. 13 illustrates still another structural example of the ferrule 311 of the optical head 310. In FIG. 13, corresponding parts to those shown in FIG. 9 are given the same reference numerals, and are not described below. In this example, the ferrule 311 is formed by a flexible optical fiber bundle 311b. According to such a structure, a housing 312 is separated from the optical circuit board 130 by the flexible optical fibers, so that it can be placed in a desired position or posture.

FIGS. 14(a) and 14(b) illustrate another example of forming lenses 135 and 136 on the optical circuit board. In this example, the lenses are formed using a die.

As shown in FIG. 14(a), an optical socket 137 to which a photo-curable resin or a thermosetting resin, that is, for example, a photo-curable adhesive 138 that hardens when irradiated with ultraviolet light is applied is roughly aligned with and temporarily mounted to the optical circuit board 130. A cylindrical die 401 is inserted into a sleeve 137a of the optical socket 137 along a fitting hole 137b. An end of the die 401 is formed with a shape corresponding to the shape of the coupling lens 135 (or 136). When the die 401 is pushed along the fitting hole 137b, the resin 138 in the fitting hole 137b is gathered at the die. It is possible to apply the photo-curable adhesive 138 to the die and insert the die into the fitting hole 137b of the sleeve 137a. A space defined by an end of the die 401, the wall of the sleeve 137a, and the surface of the glass substrate 131 of the optical circuit board 130 has the shape of, for example, a Fresnel lens or a refractive lens. The central axis of the cylindrical die 401 coincides with the central axis (optical axis) of the lens.

In this state, if necessary, the die 401 and the optical socket 137 are moved relative to the glass substrate 131 in order to precisely align (finely adjust) the alignment mark (such as an electrode or a wiring pattern) of the optical element on the glass substrate 131 with the center of the lens. For example, by watching the die 401 through the glass substrate 131 from the side of the optical element on the optical circuit board 130, it is possible to compare the alignment mark on the optical circuit board 130 and a die pattern to adjust their positions.

As shown in FIG. 14(b), the adhesive 138 is hardened by irradiating it with ultraviolet light, so that the optical socket 137 is secured to the optical circuit board 130 and the shape of the lens 135 is fixed. Thereafter, the die 401 is pulled out.

In this example, since the forming of the lenses using the die 401 and the mounting of the optical socket are carried out by the same step, it is possible to carry out the steps shown in FIGS. 5(d) to 6(a) of mounting a lens, mounting an optical socket, and aligning the optical socket and the optical circuit board at the same time.

Figure 15:
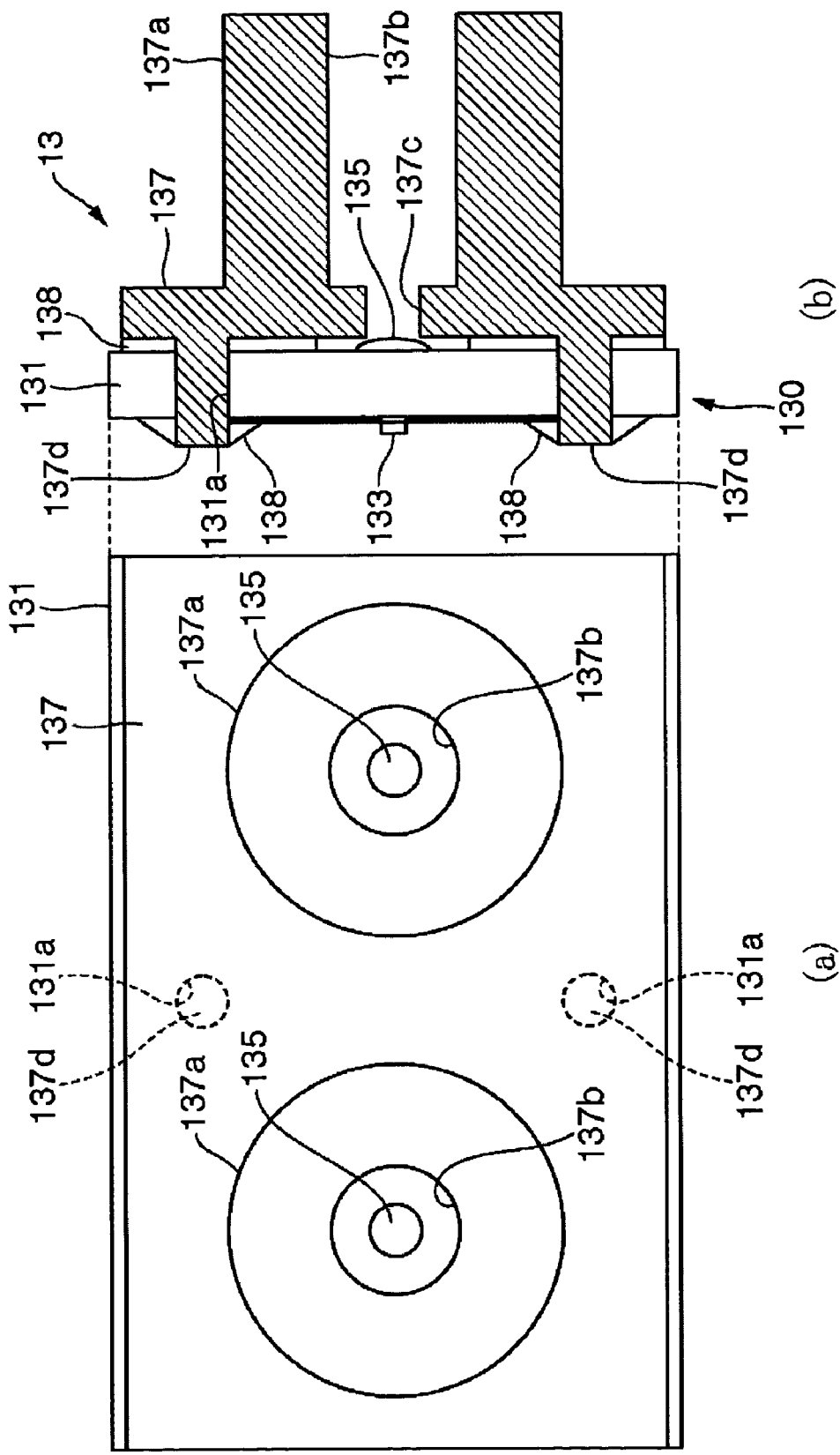
FIGS. 15(a) and 15(b) are schematics that each illustrate an example of assembling a substrate and an optical socket by using mounting holes of the substrate and mounting protrusions of the optical socket.

FIGS. 15(a) and 15(b) illustrate another exemplary embodiment. FIG. 15(a) illustrates an optical coupling unit 13 in another embodiment as viewed from the side of insertion openings of an optical plug. FIG. 15(b) is a sectional view of the optical coupling unit 13. In FIGS. 15(a) and 15(b), corresponding parts to those shown in FIGS. 2(a) and 2(b) are given the same reference numerals and are not described below.

In the exemplary embodiment, the strength with which an optical socket 137 and an optical circuit board 130 are mounted is increased. In addition, the optical socket 137 and the optical circuit board 130 are easily assembled while maintaining the precision with which the optical socket 137 is mounted to the optical circuit board 130.

Accordingly, in the exemplary embodiment, as shown in FIGS. 15(a) and 15(b), the optical socket 137 has at least two protrusions (guide pins) 137d.

Such guide pins 137d are inserted into respective guide holes 131a that are formed in a glass substrate 131 in correspondence with the guide pins 137d.

Figure 16:
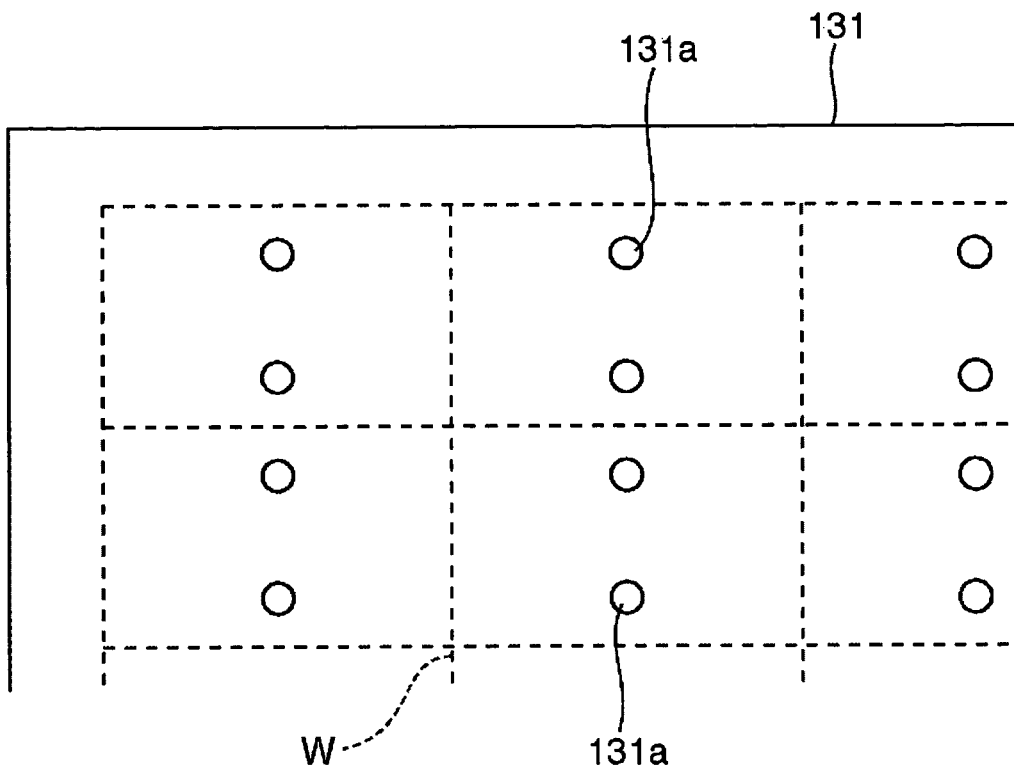
FIG. 16 is a schematic that illustrates an example of mounting holes that are formed in a substrate.

In the assembling step in the exemplary embodiment, as shown in FIG. 16, guide holes 131a having a predetermined diameter are formed with high precision at predetermined locations in the glass substrate 131 by photolithography. Optical elements and coupling lenses may also be mounted to predetermined locations of the glass substrate 131 with reference to the guide holes 131a. Wiring patterns 132 are formed on the glass substrate 131, parts are mounted (see FIG. 9), and a plurality of the optical sockets 137 are mounted (see FIG. 10).

The guide pins 137d having a predetermined depth are precisely formed at predetermined locations of each optical socket 137 with the centers of the guide holes 131a as references. The guide pins 137d of each optical socket 137 and the guide holes 131a of the glass substrate 131 are fitted together to mount the sockets 137 to the glass substrate 131. Then, by applying an adhesive 138 to the guide pins 137d and the glass substrate 131, the optical sockets 137 and the glass substrate 131 are firmly secured together.

It is possible to form an optical transceiver using an optical socket that incorporates a coupling lens.

Figure 17:
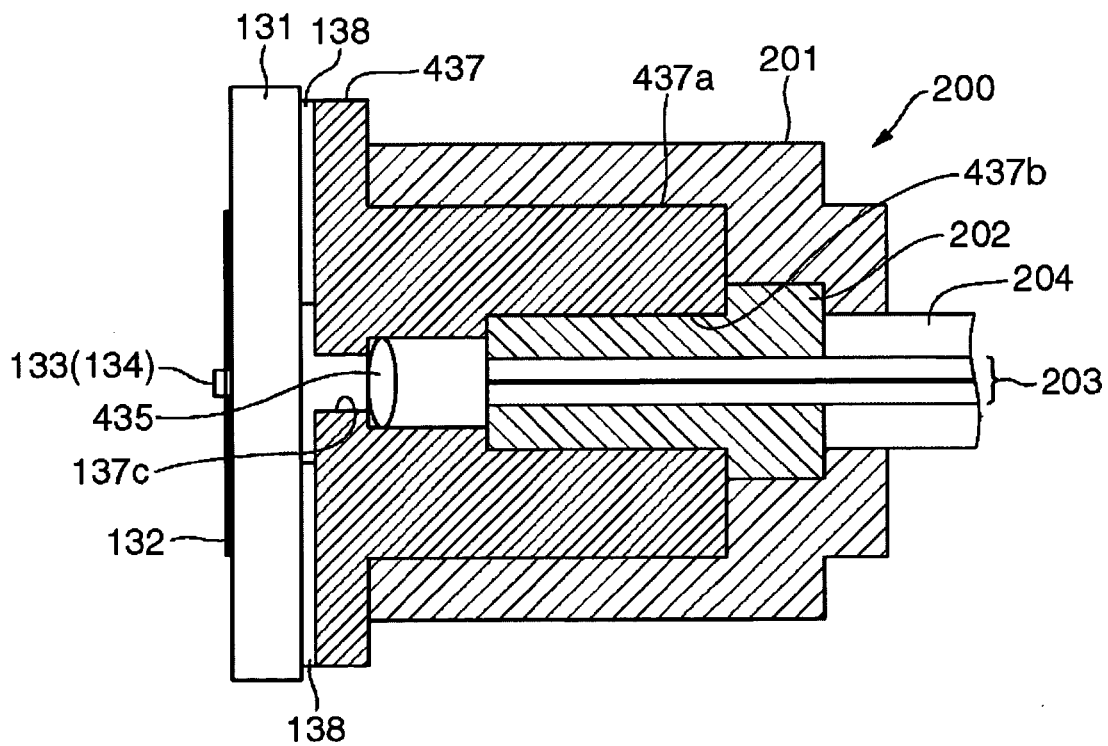
FIG. 17 is a schematic that illustrates an exemplary embodiment using an optical socket that incorporates a lens.
Figure 18:
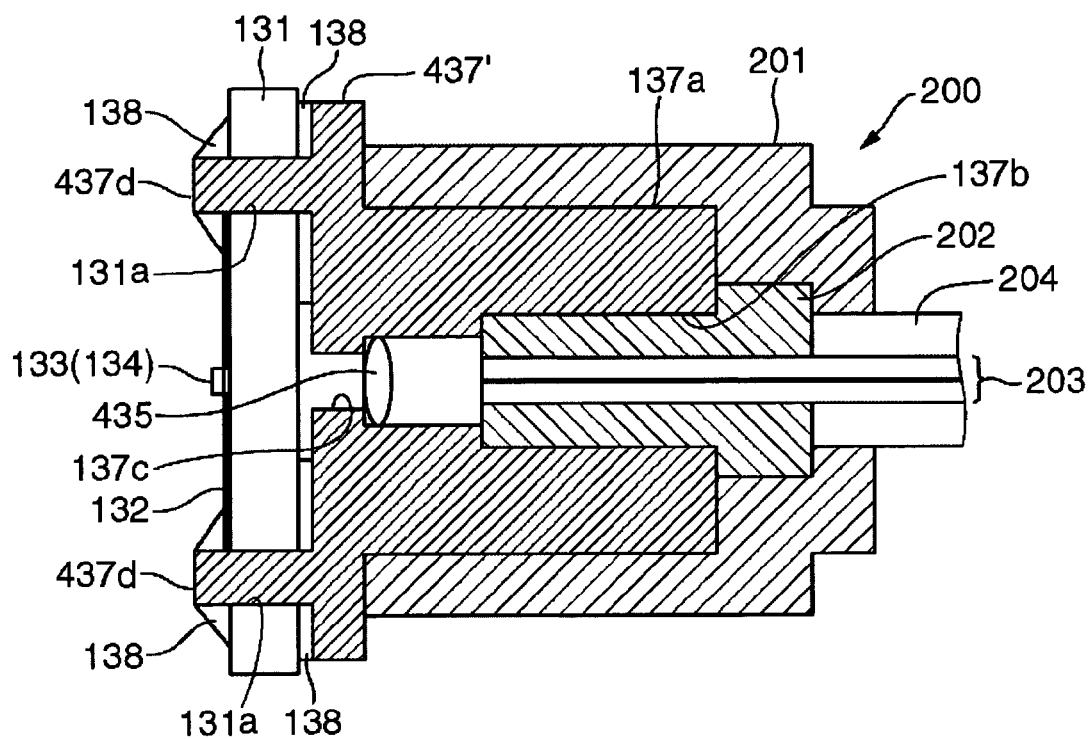
FIG. 18 is a schematic that illustrates another exemplary embodiment using an optical socket that incorporates a lens.

FIGS. 17 and 18 illustrate an exemplary embodiment using an optical socket that incorporates a lens. FIGS. 17 and 18 show a state in which an optical plug 200 is mounted to an optical socket 437 that incorporates a lens. In both these figures, corresponding parts to those shown in FIG. 3 are given the same reference numerals, and are not described below.

The optical socket 437 shown in FIG. 17 incorporates a coupling lens 435. In the exemplary embodiment shown in FIG. 17, the coupling lens 135 that is disposed on the inner surface of the glass substrate (transparent substrate) 131 in the above-described exemplary embodiments is not used.

A cylindrical ferrule 202 of the optical plug 200 is inserted into a cylindrical sleeve 437a of the optical socket 437, and is protected by a plug housing 201. The optical socket 437 and the optical plug 200 are secured by stopping means (not shown). The stopping means comprises, for example, an engageable and disengageable hook and a stud. The hook is disposed at the plug housing 201 and the stud is disposed at the optical socket 437 and engages the hook. Light from a core of the optical fiber 203 passes through the coupling lens 435 incorporated in the sleeve 437a and through the transparent substrate 131 and is focused on a light receiver 134. The light from a light emitter 133 passes through the glass substrate 131 and the coupling lens 435 and is focused on the core at an end of the optical fiber 203.

An optical socket 437' shown in FIG. 18 has a structure that is similar to the structure of the optical socket 437 shown in FIG. 17. The optical socket 437' differs in that it has a plurality of guide pins 437d. These guide pins 437d are inserted into respective guide holes 131a that are formed in the glass substrate 130 in correspondence with the guide pins 437d. In the embodiment, as in, for example, the embodiment illustrated in FIG. 15, it is possible to increase the strength with which the optical socket 437' and an optical circuit board 130 are mounted together, and to easily them while maintaining the precision with which the optical socket 437' is mounted to the optical circuit board 130.

The process of producing an optical transceiver when the optical socket 437 shown in FIG. 17 or the optical socket 437' shown in FIG. 18 is used is basically the same as the process illustrated in FIGS. 5(a) to 5(e), etc. However, since it is not necessary to form a coupling lens 135 on the glass substrate 131, the production process can be simplified.

Figure 19:
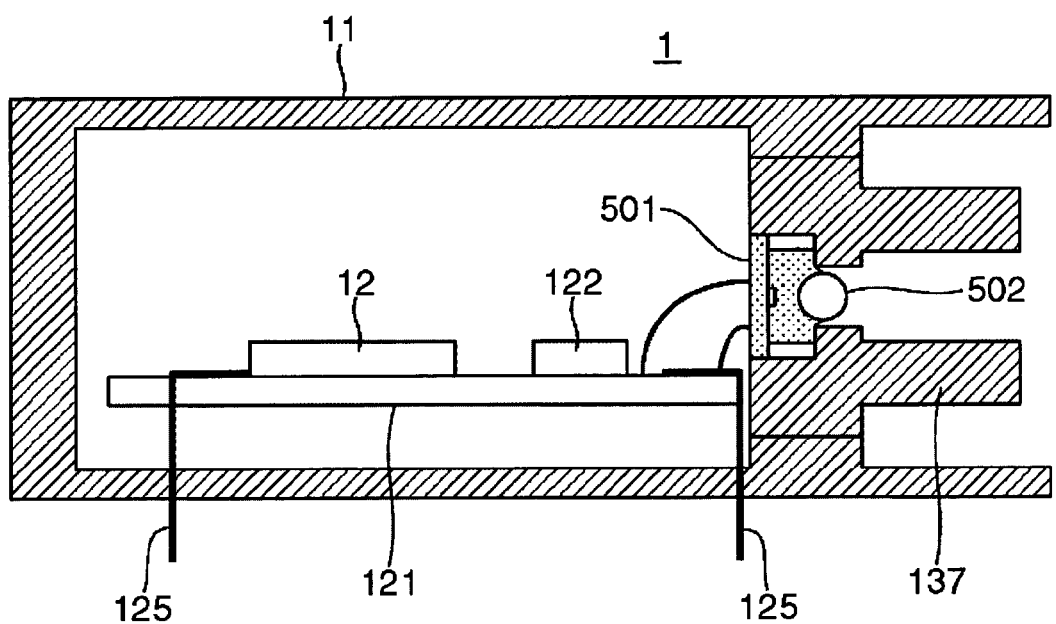
FIG. 19 is a schematic that illustrates a comparative example of an optical transceiver.

FIGS. 19 and 20 illustrate a comparative example of an optical transceiver illustrating advantages of the present invention. FIG. 19 is a sectional view of a housing of the optical transceiver of the comparative example. In FIG. 19, corresponding parts to those shown in FIG. 1(b) are given the same reference numerals, and are not described below.

Even in the comparative example, an electric signal is externally supplied to a circuit board 121 through a lead frame 125. A parallel-and-series converting circuit 12, a drive circuit 212 to drive a laser diode, and other components are mounted to the circuit board 121. The laser diode is mounted in a metal can package 501. A beam from the laser diode is focused at the center of an insertion hole of a sleeve of an optical socket 137 by a ball lens 502 mounted to a window of the can package 501.

FIG. 20 shows an optical connector in the comparative example. A ferrule 202 having an optical fiber 203 secured to the central portion thereof is inserted into the central portion of an optical plug 200. When the optical plug 200 is connected to a socket 137, light that has been focused by the ball lens 502 impinges upon the center of a core of the optical fiber 203.

In the structure of such a comparative example, it is necessary to perform, for example, the steps of mounting a laser diode chip to the interior of the can package 501, bonding the chip and a lead wire, adhering the ball lens to the window of the can package, and assembling the can package having a lens. In addition, it is also necessary to perform the steps of inserting the can package into one of the holes of the sleeve of the socket, inserting the ferrule supporting the fiber into the other hole of the sleeve, and adhering the can package and the sleeve at a location where light emitted from the laser diode is transmitted most efficiently. Thereafter, the production step is completed by soldering a lead wire of the can package to the circuit board.

Since the optical transceiver of the comparative example having such a structure has a three-dimensional structure, when the parts are assembled, complicated aligning operations must be carried out. In contrast, according to the exemplary embodiments of the present invention, since the optical transceiver is formed using a light-transmissive substrate, the parts can be assembled by a substantially two-dimensional aligning operation, which is desirable.

As described above, according to the exemplary embodiments of the present invention, the optical coupling unit of the optical transceiver is formed by disposing a wiring and an optical element on one surface of a transparent substrate, and by disposing a coupling lens and a sleeve on the other surface of the substrate. By virtue of such a structure, it is possible to form a plurality of sets of the wiring patterns and the coupling lenses on one substrate and cut these out into subsubstrates to produce optical coupling units, so that this production method is suitable for mass production.

Prior to adhering the sleeve and the lens, the sleeve and the lens may be either manually or automatically moved two-dimensionally and aligned so that an alignment mark of the ferrule of the position adjustor and the alignment mark on the substrate overlap. This method is simple and suited for automation.

Elements and sleeves can be successively mounted at a high speed while sliding the glass substrate.

It is possible to inspect individual temporary coupling units while sliding the glass substrate, adjust the outputs of surface emitting lasers (VCSEL), and adjust the sensitivity of light-emitting diodes (PD).

According to the adjustment method using the optical head in the exemplary embodiments, by an imaging operation using a CCD, the relative positions between a ferrule alignment mark and an alignment mark on a light emitter or a light receiver can be precisely detected by image processing. Therefore, by reducing the numbers of positional detections and movement loops, the positioning can be carried out at a high speed.

Comparing the mounting and assembling of parts of the present invention with the related mounting and assembling of parts, costs can be greatly reduced.

The present invention is not limited to the above-described exemplary embodiments, so that various other forms may be realized within the gist of the present invention. For example, a plurality of lenses may be suitably used as light-condensing devices disposed between the optical element and the optical fiber (that is, on the optical axis).

Figure 27:
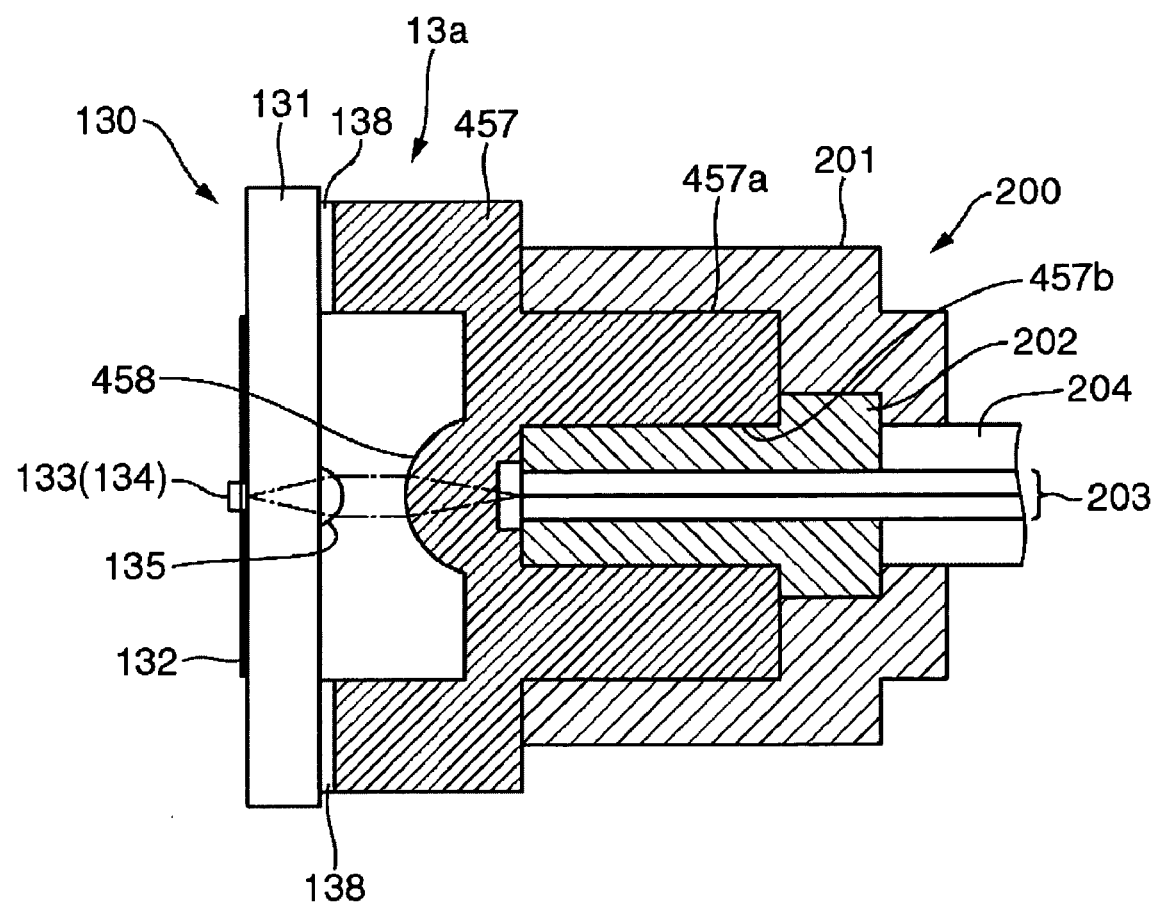
FIG. 27 is a schematic that illustrates a structure of an optical transceiver having a plurality of light-condensing devices disposed on its optical axis.
Figure 28:
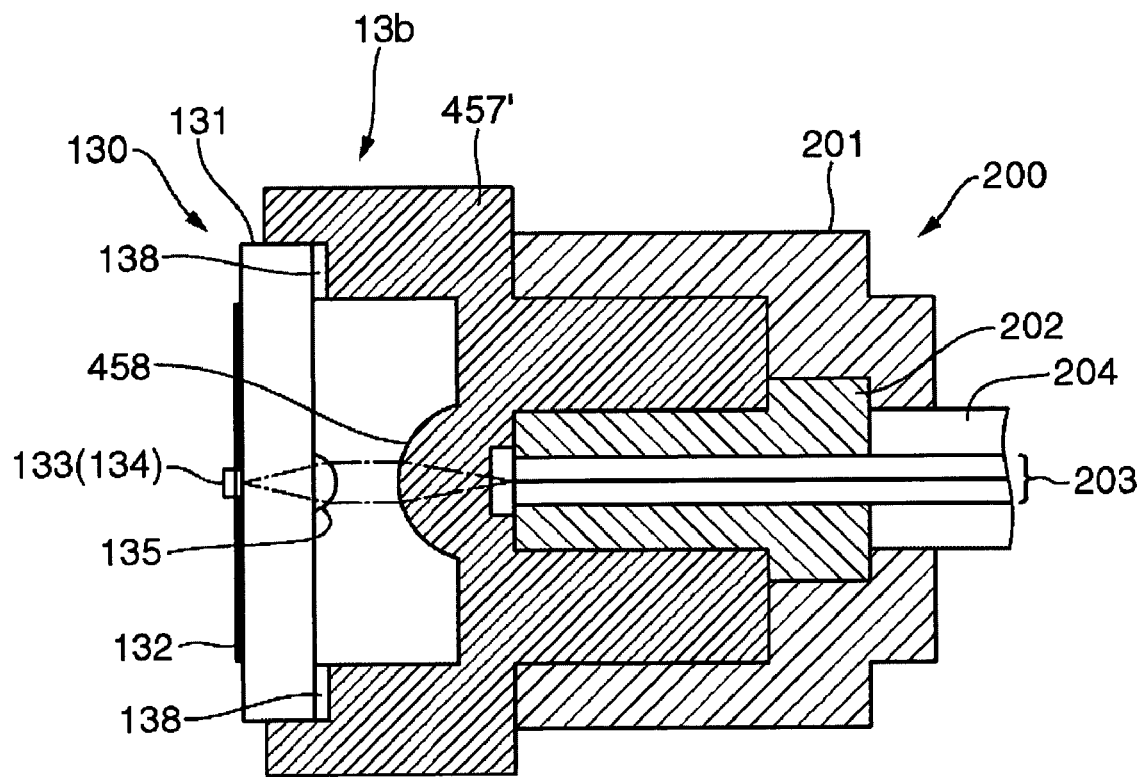
FIG. 28 is a schematic that illustrates another structure of the optical transceiver having a plurality of light-condensing devices disposed on its optical axis.

FIGS. 27 and 28 each show a structure of an optical transceiver when a plurality of light-condensing devices are disposed on an optical axis, with an optical coupling unit of the optical transceiver being shown in detail.

An optical coupling unit 13a shown in FIG. 27 includes, for example, an optical circuit board 130, an optical socket 457, and a joining film 138. The optical circuit board 130 is formed by disposing a wiring film 132, a light emitter 133, a light receiver 134, a coupling lens 135, etc., on a transparent glass substrate 131. The optical socket 457 is connected to an optical plug 200 disposed at one end of an optical fiber 203. The joining film 138 is used to mount the optical socket 457 to a surface of the optical circuit board 130. The optical coupling unit 13a also includes a coupling lens 458 disposed near an end of the optical socket 457, more specifically, at a location, which opposes the optical element 133 or 134, in the inner side of a hollow housing that is disposed at a side contacting the glass substrate 131.

More specifically, in the exemplary embodiment, two lenses, that is, the coupling lenses 135 and 458, are disposed as light-condensing devices on the optical axis. In addition, in the exemplary embodiment, the focal lengths of the coupling lenses 135 and 458 are set so that light passing between them is collimated. By integrally forming the optical socket 457 and the coupling lens 458 using a die, sleeves 457a and the coupling lens 458 are precisely aligned and formed.

By virtue of such a structure, if light (from the optical element 133) focused by the coupling lens 135 enters an area within an effective diameter of the coupling lens 458, or if light (from the optical fiber) focused by the coupling lens 458 enters an area within an effective diameter of the coupling lens 135, optical coupling can be achieved mutually between the optical element 133 and the optical fiber 203. Therefore, it becomes very easy to align the optical socket and the optical element with each other, and costs can be reduced due to a simplified production process. The coupling lens 458 may be disposed in the form shown in FIG. 17 or FIG. 18.

An optical coupling unit 13b shown in FIG. 28 has basically almost the same structure as the structure of the optical coupling unit 13a illustrated above and shown in FIG. 27. The optical coupling unit 13b differs in that a cutaway portion is further formed in a housing portion that is disposed at an end portion of an optical socket 457' and in that an optical circuit board 130 and the cutaway portion are aligned by fitting them together. In this way, when a plurality of light-condensing devices are disposed on the optical axis, since there is a very low demand for alignment precision, a complicated aligning operation is not required so much, so that it is possible to use an easily formable structure such as that shown in FIG. 28.

In the present invention, an optical socket, a light-condensing device, and an optical element are supported by a light-transmissive substrate so that an optical fiber, the light-condensing device, and the optical element are aligned on one optical axis. Although, in the above-described exemplary embodiments, the structure of an optical transceiver is described as having a straight optical axis, the optical axis does not necessarily have to be straight.

Figure 29:
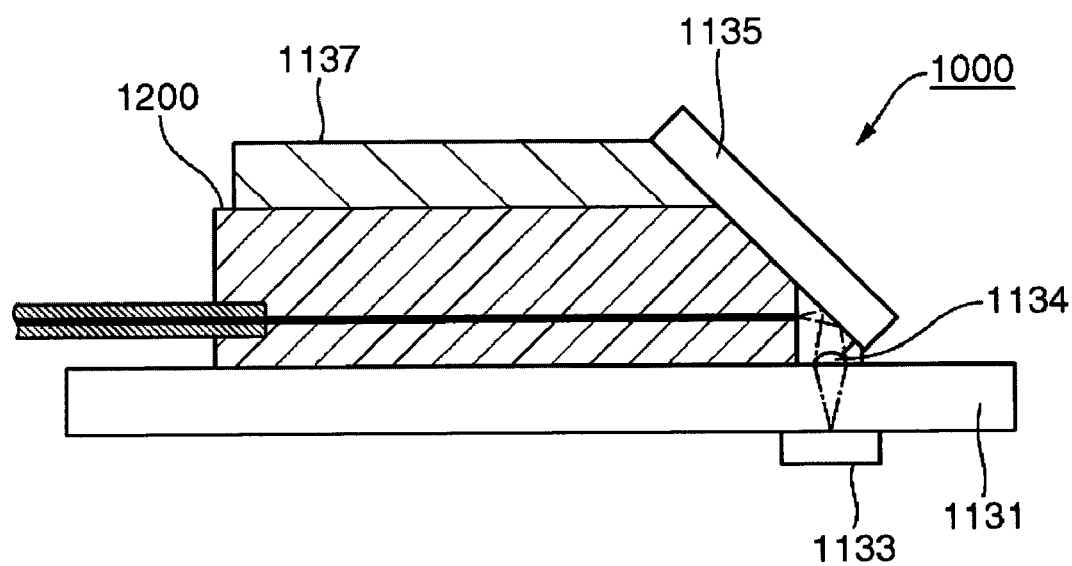
FIG. 29 is a schematic that illustrates another structure of the optical transceiver.

FIG. 29 illustrates another structure of the optical transceiver. An optical transceiver 1000 shown in FIG. 29 includes an optical socket 1137, a coupling lens array 1134, an optical element 1133, and a light-transmissive substrate 1131. The optical socket 1137 is provided for mounting an optical plug 1200 disposed at one end of an optical fiber. The coupling lens array 1134 functions as a light-condensing device. The optical element 1133 is either a light emitter, such as a VCSEL, to emit light in accordance with a supplied electrical signal or a light receiver to generate an electrical signal in accordance with a received signal. The substrate 1131 supports the optical socket 1137, the coupling lens array 1134, and the optical element 1133 so that the optical fiber, the coupling lens array 1134, and the optical element 1133 are aligned on one optical axis. In the exemplary embodiment, the optical socket 1137 is disposed on the substrate 1131 so that the direction of extension of the optical fiber and the substrate 1131 are substantially parallel to each other. A reflector 1135 to change the path of light from the optical element 1133 or the optical fiber by substantially 90 degrees is disposed on one end of the optical socket 1137. In this way, in the present invention, the "one optical axis" may be bent at some point in another direction as in the exemplary embodiment shown in FIG. 29 in addition to being straight. Even in such a case, the operational advantages of the present invention such as those described above can be provided.

What is claimed is:

1. An optical transceiver for use with an optical plug disposed at one end of an optical fiber, comprising:
    an optical socket to mount the optical plug;
    a plurality of light-condensing devices;
    an optical element to perform at least one of emitting light in accordance with a supplied electrical signal, and generating an electrical signal in accordance with a received light signal; and
    a light-transmissive substrate to support the optical socket, the light-condensing device, and the optical element so that the optical fiber, the light-condensing device, and the optical element are aligned on an optical axis of the optical transceiver,
    wherein the optical element is disposed on one surface of the substrate and the optical socket is disposed on the other surface of the substrate in correspondence with the location of the optical element, and the plurality of the light-condensing devices being used, with one of the light-condensing devices being disposed on the other surface of the substrate in correspondence with the location of the optical element and another light-condensing device being disposed near an end of the optical socket so as to oppose the optical element.

2. An optical transceiver for use with an optical plug that holds one end of a first optical fiber and one end of a second optical fiber, comprising:
    an optical socket to mount the optical plug;
    first and second light-condensing devices;
    a light emitter to emit light in accordance with a supplied electrical signal;
    a light receiver to generate an electrical signal in accordance with a received light signal; and
    a light-transmissive substrate to support the optical socket, the first and second light-condensing devices, the light emitter, and the light receiver so that the first optical fiber, the first light-condensing device, and the light emitter are aligned on a first optical axis of the optical transceiver and so that the second optical fiber, the second light-condensing device, and the light receiver are aligned on a second optical axis of the optical transceiver,
    wherein the light emitter and light receiver are disposed on one surface of the substrate and the optical socket is disposed on the other surface of the substrate in correspondence with the location of the light emitter and light receiver, and the first and second light-condensing devices being used, with one of the light-condensing devices being disposed on the other surface of the substrate in correspondence with the location of the light emitter and light receiver, and another light-condensing device being disposed near an end of the optical socket so as to oppose the light emitter and light receiver.

3. An optical transceiver for use with an optical plug disposed at one end of an optical fiber, comprising:
    an optical socket to mount the optical plug;
    a plurality of light-condensing devices;
    an optical element to perform at least one of emitting light in accordance with a supplied electrical signal, and generating an electrical signal in accordance with a received light signal; and
    a light-transmissive substrate to support the optical socket, the light-condensing device, and the optical element so that the optical fiber, the light-condensing device, and the optical element are aligned on an optical axis of the optical transceiver, the optical element being disposed on one surface of the substrate, and the light-condensing device and the optical socket being disposed on the other surface of the substrate in correspondence with the location of the optical element, wherein the optical element is disposed on one surface of the substrate and the optical socket is disposed on the other surface of the substrate in correspondence with the location of the optical element, and the plurality of the light-condensing devices being used, with one of the light-condensing devices being disposed on the other surface of the substrate in correspondence with the location of the optical element and another light-condensing device being disposed near an end of the optical socket so as to oppose the optical element.

4. The optical transceiver according to claim 1, the substrate being a glass substrate.

5. The optical transceiver according to claim 1, the substrate having a plurality of guide holes, and the optical socket having a plurality of guide pins that are disposed in the respective guide holes.

6. The optical transceiver according to claim 1, the optical socket being joined to the substrate.

7. The optical transceiver according to claim 1, the light-condensing device being any one of a refractive lens, a Fresnel lens, and a Selfoc lens.

8. The optical transceiver according to claim 1, at least one of the optical element and the light emitter being a surface emitting laser.

9. The optical transceiver according to claim 2, the light emitter and the light receiver being disposed on one surface of the substrate, and the first and second light-condensing devices and the optical socket being disposed on the other surface of the substrate, with the first and second light-condensing devices being disposed on the other surface of the substrate in correspondence with the locations of the light emitter and the light receiver, respectively.

10. The optical transceiver according to claim 2, the light emitter and the light receiver being disposed on one surface of the substrate and the optical socket being disposed on the other surface of the substrate in correspondence with the locations of the light emitter and the light receiver, and the first and second light-condensing devices being disposed so that one of the first and second light-condensing devices is disposed on the other surface of the substrate in correspondence with the location of one of the light emitter and the light receiver and the other of the first and second light-condensing devices is disposed near an end of the optical socket so as to oppose the one of the light emitter and the light receiver.

11. An optical transceiver for use with an optical plug that holds one end of a first optical fiber and one end of a second optical fiber, comprising:

an optical socket to mount the optical plug;

first and second light-condensing devices;

a light emitter to emit light in accordance with a supplied electrical signal;

a light receiver to generate an electrical signal in accordance with a received light signal; and a light-transmissive substrate to support the optical socket, the first and second light-condensing devices, the light emitter, and the light receiver so that the first optical fiber, the first light-condensing device, and the light emitter are aligned on a first optical axis of the optical transceiver, the light emitter being disposed on one surface of the substrate, and the first light-condensing device and the optical socket being disposed on the other surface of the substrate in correspondence with the location of the light emitter, and so that the second optical fiber, the second light-condensing device, and the light receiver are aligned on a second optical axis of the optical transceiver, the light receiver being disposed on one surface of the substrate, and the second light-condensing device and the optical socket being disposed on the other surface of the substrate in correspondence with the location of the light receiver.

* * * * *